US010029758B2

(12) United States Patent
McAndrews et al.

(10) Patent No.: US 10,029,758 B2
(45) Date of Patent: *Jul. 24, 2018

(54) BICYCLE AIR SPRING

(71) Applicant: SPECIALIZED BICYCLE COMPONENTS, INC., Morgan Hill, CA (US)

(72) Inventors: Michael McAndrews, Capitola, CA (US); Brian Lampman, Aptos, CA (US)

(73) Assignee: Specialized Bicycle Components, Inc., Morgan Hill, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/346,609

(22) Filed: Nov. 8, 2016

(65) Prior Publication Data

US 2017/0050698 A1 Feb. 23, 2017

Related U.S. Application Data

(63) Continuation of application No. 13/957,327, filed on Aug. 1, 2013, now Pat. No. 9,518,630.

(51) Int. Cl.
*F16F 9/06* (2006.01)
*B62K 25/28* (2006.01)
(Continued)

(52) U.S. Cl.
CPC ............... *B62K 25/28* (2013.01); *B62K 3/02* (2013.01); *F16F 9/0209* (2013.01); *F16F 9/062* (2013.01); *F16F 9/065* (2013.01)

(58) Field of Classification Search
CPC .. F16F 9/062; F16F 9/063; F16F 9/064; F16F 9/067; F16F 9/18; F16F 9/182;
(Continued)

(56) References Cited

U.S. PATENT DOCUMENTS 1,904,372 A 4/1933 Kane
4,613,115 A * 9/1986 Smith ................... F16F 9/0209
267/120

(Continued)

FOREIGN PATENT DOCUMENTS

WO WO-2006032052 A3 3/2006

*Primary Examiner* — Bradley T King
*Assistant Examiner* — Stephen M Bowes
(74) *Attorney, Agent, or Firm* — Knobbe Martens Olson & Bear LLP

(57) ABSTRACT

An air spring comprising a pressurized first chamber including a gas, a first piston adjacent the first chamber and configured to slideably move relative to the first chamber, pressurized second chamber adjacent the first piston and opposite the first chamber, the air spring configured such that the first piston moves towards the first chamber during compression of the air spring and the first piston moves away from the first chamber during extension of the air spring, wherein as said first piston moves towards the first chamber during compression of the air spring, said first piston pushes at least a portion of said gas within said first chamber in a direction opposite said first piston, a second piston configured to slideably move relative to the first chamber, a pressurized third chamber adjacent the second piston and opposite the first chamber.

14 Claims, 13 Drawing Sheets

(51) Int. Cl.
*F16F 9/02* (2006.01)
*B62K 3/02* (2006.01)

(58) Field of Classification Search
CPC .......... F16F 9/185; F16F 9/585; F16F 9/0236; F16F 9/0209; F16F 9/065; F15B 15/22
See application file for complete search history.

(56) References Cited

U.S. PATENT DOCUMENTS

| | | | |
|---|---|---|---|
| 4,647,026 A * | 3/1987 | Siemann | F16F 9/062 188/281 |
| 4,718,647 A | 1/1988 | Ludwig | |
| 5,775,677 A | 7/1998 | Englund | |
| 6,202,807 B1 | 3/2001 | Levi | |
| 6,374,966 B1 * | 4/2002 | Lillbacka | B60G 15/12 188/266 |
| 6,474,629 B2 | 11/2002 | Bec et al. | |
| 6,698,729 B2 | 3/2004 | Popjoy | |
| 7,017,893 B1 | 3/2006 | Vincenzo | |
| 7,036,802 B2 | 5/2006 | Beck | |
| 9,518,630 B2 * | 12/2016 | McAndrews | F16F 9/0209 |
| 9,651,066 B2 * | 5/2017 | Moretti | F15B 15/22 |
| 2006/0231360 A1 * | 10/2006 | Chen | F16F 9/0209 188/314 |
| 2008/0106012 A1 | 5/2008 | Turner | |
| 2009/0236807 A1 | 9/2009 | Wootten et al. | |
| 2010/0044975 A1 | 2/2010 | Yablon et al. | |
| 2010/0244340 A1 | 9/2010 | Wootten et al. | |
| 2011/0155524 A1 | 6/2011 | Crasset | |
| 2011/0215551 A1 | 9/2011 | Galasso et al. | |
| 2012/0305350 A1 | 12/2012 | Ericksen et al. | |
| 2013/0118847 A1 * | 5/2013 | Krahenbuhl | F16F 9/0209 188/313 |
| 2013/0134687 A1 | 5/2013 | Laird et al. | |

* cited by examiner

BICYCLE AIR SPRING

CROSS-REFERENCE TO RELATED APPLICATIONS

This application is a continuation of U.S. patent application Ser. No. 13/957,327, titled BICYCLE AIR SPRING, filed on Aug. 1, 2013, which is hereby incorporated by reference herein in its entirety.

TECHNICAL FIELD

The present technology relates to air springs and, in particular, bicycle air springs suitable for use in connection with off-road bicycles.

DESCRIPTION OF THE RELATED TECHNOLOGY

Off-road bicycles, or mountain bikes, may be equipped with front and rear suspension assemblies operably positioned between the frame of the bicycle and the front and rear wheels, respectively. Providing front and rear suspension on a mountain bike potentially improves handling and performance by absorbing bumps, and other rough trail conditions, which may be encountered while riding off-road. Because a mountain bike is propelled solely by power output from the rider, it is desirable that the front and rear suspension assemblies be lightweight. Suspension systems of engine-driven vehicles commonly emphasize strength over weight and, therefore, have not been widely incorporated on mountain bikes. One way to reduce weight is to utilize an air spring instead of a conventional metal coil spring.

SUMMARY

The systems, methods and devices described herein have innovative aspects, no single one of which is indispensable or solely responsible for their desirable attributes. Without limiting the scope of the claims, some of the advantageous features will now be summarized.

One aspect of the present invention is the realization that the load v. displacement curve of a conventional air spring may not be ideal for a mountain bike suspension system. In addition, a conventional air spring may experience spikes in the load v. displacement curve when the air spring experiences high velocities due to the adiabatic effect. Thus, there exists a need for an improved bicycle air spring. Accordingly an improved air spring is disclosed herein.

According to some embodiments, an air spring comprises a pressurized first chamber including a gas, a first piston adjacent the first chamber and configured to slideably move relative to the first chamber, a pressurized second chamber adjacent the first piston and opposite the first chamber, wherein the first piston is configured to seal the first chamber from the second chamber, the air spring configured such that the first piston moves towards the first chamber during compression of the air spring and the first piston moves away from the first chamber during extension of the air spring, wherein as said first piston moves towards the first chamber during compression of the air spring, said first piston pushes at least a portion of said gas within said first chamber in a direction opposite said first piston, a second piston configured to slideably move relative to the first chamber, a pressurized third chamber adjacent the second piston and opposite the first chamber, wherein the second piston is configured to seal the first chamber from the third chamber, and wherein the air spring is configured such that the at least a portion of the gas within the first chamber moved by the first piston in a direction opposite the first piston moves the second piston away from the first chamber when the pressure inside the first chamber is greater than the pressure inside the third chamber.

According to another embodiment, the air spring comprises a retaining portion, the retaining portion configured to limit displacement of the second piston towards the first chamber.

According to another embodiment, the retaining portion is configured to retain the second piston in a retained position until the pressure in the first chamber is greater than the pressure in the third chamber.

According to another embodiment, the first piston is spaced from the second piston.

According to another embodiment, at least a portion of the gas of the primary chamber is located between the first piston and second piston.

According to another embodiment, the first piston is disposed at a first end of the primary chamber and the second piston is disposed at a second end of the primary chamber, the first end of the primary chamber substantially opposite the second end of the primary chamber.

According to another embodiment, the air spring comprises a first member and a second member, wherein the second member slideably moves relative to the first member when the air spring is compressed or extended.

According to another embodiment, the first piston is affixed to the first member.

According to another embodiment, the first chamber is located substantially within the first member.

According to another embodiment, the second chamber is located substantially within the first member.

According to another embodiment, the second piston can slide relative to the first member and second member during at least a portion of the range of motion of the air spring.

According to another embodiment, the air spring comprises a third member, wherein the third chamber is located substantially within the third member.

According to another embodiment, the third member is located externally from the second member.

According to another embodiment, the third member is located externally from the first member.

According to another embodiment, the air spring has an air spring range of travel comprising the difference in length of the air spring between a fully extended position and a fully compressed position, wherein a bicycle has a frame and a subframe, wherein the subframe is rotatably coupled to the frame at a first end of the subframe and rotatably coupled to the rear wheel at a second end of the subframe, wherein a first end of the air spring is configured to be rotatably coupled to the frame and a second end of the air spring is configured to be rotatably coupled to the subframe such that rotation of the subframe relative to the frame causes either extension or compression of the air spring, wherein the rear wheel of the bicycle has a rear wheel vertical range of travel, and wherein the air spring is configured to provide the desired rear wheel vertical range of travel when the subframe and frame are configured such that the ratio between the rear wheel vertical range of travel and the air spring range of travel greater than 1.25. According to another embodiment, the air spring comprises a spring curve, wherein the spring curve comprises a bump zone comprising the range of travel of the air spring between 30% compression and 70% compression of the air spring, and wherein the air spring is configured to provide an average spring rate greater than 8 lbs./mm in the bump zone of the spring curve of the air spring.

According to another embodiment, an air spring comprises a pressurized first chamber; a first piston adjacent the first chamber and configured to slideably move relative to the first chamber; a pressurized second chamber adjacent the first piston and opposite the first chamber; wherein the first piston is configured to seal the first chamber from the second chamber; the air spring configured such that the first piston decreases the volume of the first chamber during compression of the air spring and the first piston increases the volume of the first chamber during extension of the air spring; a second piston adjacent the first chamber and configured to slideably move relative to the first chamber; a pressurized third chamber adjacent the second piston and opposite the first chamber; wherein the second piston is configured to seal the first chamber from the third chamber; wherein the air spring is configured such that the second piston increases the volume of the first chamber when the pressure inside the first chamber is greater than the pressure inside the third chamber.

According to another embodiment, an air spring comprises a pressurized first chamber; a first piston adjacent the first chamber and configured to slideably move relative to the first chamber, the first chamber configured to decrease in volume when the first piston slides in a first direction, the first chamber configured to increase in volume when the first piston slides in a second direction; a pressurized second chamber configured to force the first piston in the first direction; wherein the first piston is configured to seal the first chamber from the second chamber; a second piston adjacent the first chamber and configured to slideably move relative to the first chamber, the first chamber decreasing in volume when the second piston slides in a third direction, the first chamber increasing in volume when the second piston slides in a fourth direction; a pressurized third chamber configured to force the second piston in the third direction; wherein the second piston is configured to seal the first chamber from the third chamber; wherein the first chamber is configured such that pressure in the first chamber forces the first piston in the second direction; wherein the first chamber is configured such that pressure in the first chamber forces the second piston in the fourth direction; a retaining portion, the retaining portion configured to limit displacement of the second piston in the third direction.

According to another embodiment, the first direction is the same as the third direction and wherein the second direction is the same as the fourth direction.

According to another embodiment, the first direction is the same fourth direction and wherein the second direction is the same as the third direction.

According to another embodiment, the air spring comprises a retaining portion, the retaining portion configured to limit displacement of the second piston in the third direction, the retaining portion is configured to retain the second piston in a retained position until the pressure in the first chamber is greater than the pressure in the third chamber.

According to another embodiment, the air spring comprises a retaining portion, the retaining portion configured to limit displacement of the second piston in the fourth direction, the retaining portion is configured to retain the second piston in a retained position until the pressure in the first chamber is greater than the pressure in the third chamber.

According to another embodiment, an air spring comprises a pressurized first chamber; a first piston adjacent the first chamber, the first piston configured to seal the first chamber, the first piston configured to slideably move relative to the first chamber, the first chamber configured to decrease in volume when the first piston slides in a first direction and the first chamber configured to increase in volume when the first piston slides in a second direction; a second spring configured to force the first piston in the first direction; a second piston adjacent the first chamber, the second piston configured to seal the first chamber, the second piston configured to slideably move relative to the first chamber, the first chamber decreasing in volume when the second piston slides in a third direction and the first chamber increasing in volume when the second piston slides in a fourth direction; a third spring configured to force the second piston in a third direction; wherein the first chamber is configured such that pressure in the first chamber forces the first piston in the second direction; wherein the first chamber is configured such that pressure in the first chamber forces the second piston in the fourth direction; a retaining portion, the retaining portion configured to limit displacement of the second piston in the third direction.

According to another embodiment, an air spring can have a range of motion between a fully extended position and a fully compressed position, the range of motion divided into an extended portion and a compressed portion, the extended portion nearest the fully extended position and the compressed portion nearest the fully extended position, the air spring comprising a pressurized first chamber; a first piston adjacent the first chamber and configured to slideably move relative to the first chamber, a pressurized second chamber adjacent the first piston and opposite the first chamber; wherein the first piston is configured to seal the first chamber from the second chamber; the air spring configured such that the first piston decreases the volume of the first chamber during compression of the air spring and the first piston increases the volume of the first chamber during extension of the air spring; a second piston adjacent the first chamber and configured to slideably move relative to the first chamber; a pressurized third chamber adjacent the second piston and opposite the first chamber; wherein the second piston is configured to seal the first chamber from the third chamber; wherein the air spring is configured such that the second piston increases the volume of the first chamber during compression of the air spring within the compressed portion of the range of motion of the air spring.

According to another embodiment, an air spring can have a range of motion between a fully extended position and a fully compressed position, the range of motion divided into an extended portion and a compressed portion, the extended portion nearest the fully extended position and the compressed portion nearest the fully extended position, the air spring comprising a pressurized first chamber; a first piston adjacent the first chamber and configured to slideably move relative to the first chamber; a pressurized second chamber adjacent the first piston and opposite the first chamber; wherein the first piston is configured to seal the first chamber from the second chamber; the air spring configured such that the first piston moves towards the first chamber during compression of the air spring and the first piston moves away from the first chamber during extension of the air spring; a second piston adjacent the first chamber and configured to slideably move relative to the first chamber; a pressurized third chamber adjacent the second piston and opposite the first chamber; wherein the second piston is configured to seal the first chamber from the third chamber; wherein the air spring is configured such that the second piston moves away from the first chamber during compression of the air spring within the compressed portion of the range of motion of the air spring.

BRIEF DESCRIPTION OF THE DRAWINGS

The above-mentioned aspects, as well as other features, aspects, and advantages of the present technology will now be described in connection with various embodiments, with reference to the accompanying drawings. The illustrated embodiments, however, are merely examples and are not intended to be limiting. Like reference numbers and designations in the various drawings indicate like elements.

DETAILED DESCRIPTION

Figure 1:
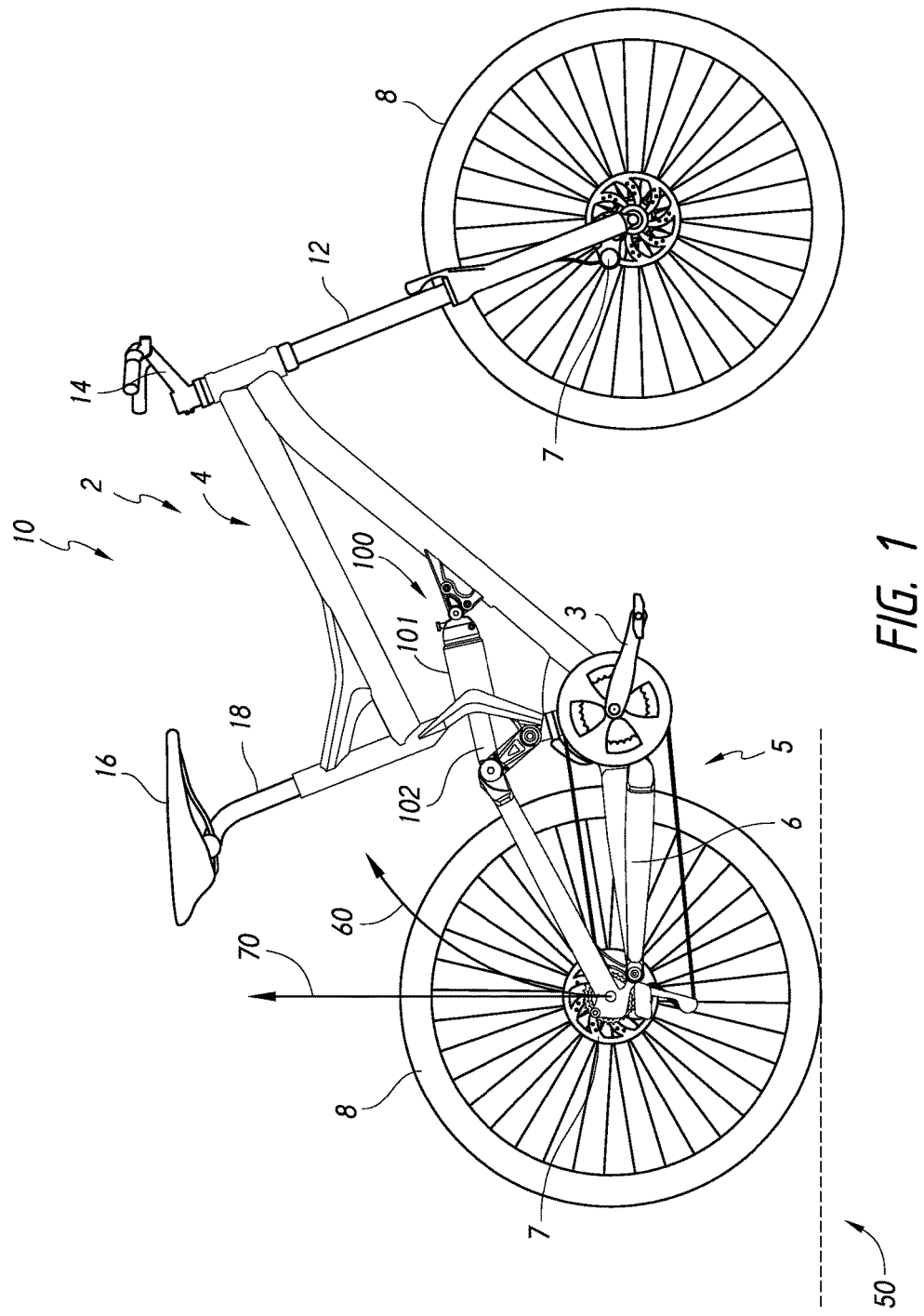
FIG. 1 illustrates a side view of an off-road bicycle, including one embodiment of an air spring.

In the following detailed description, reference is made to the accompanying drawings, which form a part of the present disclosure. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and form part of this disclosure. For example, a system or device may be implemented or a method may be practiced using any number of the aspects set forth herein. In addition, such a system or device may be implemented or such a method may be practiced using other structure, functionality, or structure and functionality in addition to or other than one or more of the aspects set forth herein. Alterations and further modifications of the inventive features illustrated herein, and additional applications of the principles of the inventions as illustrated herein, which would occur to one skilled in the relevant art and having possession of this disclosure, are to be considered within the scope of the invention.

Descriptions of unnecessary parts or elements may be omitted for clarity and conciseness, and like reference numerals refer to like elements throughout. In the drawings, the size and thickness of layers and regions may be exaggerated for clarity and convenience.

Features of the present disclosure will become more fully apparent from the following description and appended claims, taken in conjunction with the accompanying drawings. It will be understood these drawings depict only certain embodiments in accordance with the disclosure and, therefore, are not to be considered limiting of its scope; the disclosure will be described with additional specificity and detail through use of the accompanying drawings. An apparatus, system or method according to some of the described embodiments can have several aspects, no single one of which necessarily is solely responsible for the desirable attributes of the apparatus, system or method. After considering this discussion, and particularly after reading the section entitled "Detailed Description" one will understand how illustrated features serve to explain certain principles of the present disclosure.

This application is directed to an improved air spring suitable for use on off-road bicycles. FIG. 1 illustrates a side view of an off-road bicycle 10, including one embodiment of an air spring 100. The bicycle 10 includes a frame 2, preferably comprised of a generally triangular main frame portion 4 and an articulating frame portion, such as a subframe 6. As illustrated in FIG. 1, the subframe 6 is rotatably coupled to the main frame 4. A rear wheel 8 of the bicycle 10 is rotatably coupled to the subframe 6. In FIG. 1, the air spring 100 is illustrated in a fully extended position with the rear wheel 8 adjacent a reference plane 50. The reference plane 50 remains in the same position relative to the main frame 4 of the bicycle 10. As the subframe 6 rotates, the rear wheel 8 travels through an arc 60. The vertical movement 70 of the rear wheel 8 is referred to as the "rear wheel vertical range of travel." The vertical movement of the rear wheel can be measured from the reference plane 50.

In some embodiments, the air spring 100 can include a first member 101 and a second member 102. The first member 101 can be slideably coupled to the second member 102. The air spring 100 can be configured to force the first member 101 in one direction and the second member 102 in a second direction, opposite the second direction. As illustrated in FIG. 1, one portion of the air spring 100, such as for example the first member 101, can be rotatably coupled to the main frame 4 and another portion of the air spring 100, such as for example the second member 102, can be rotatably coupled the subframe 6, such that the air spring 100 can manipulate the rotation of the subframe 6, and thus, movement of the rear wheel 8 relative to the bicycle 10 frame 2. The first member 101 can slide relative to the second member 102 between a fully extended position and a fully compressed position. The air spring 100 has an "air spring range of travel" defined by the difference in length of the air spring 100 between the fully extended position and the fully compressed position. The "motion ratio" of the bicycle 10 is defined as the ratio of the rear wheel vertical range of travel to the air spring 100 range of travel. The "spring rate" of the air spring 100 is defined as the change in the force exerted by the air spring 100 divided by the change in length of the air spring 100. The spring rate of the air spring 100 can vary depending on position of the first member 101 relative to the second member 102. The "wheel rate" of the bicycle 10 is defined as the change in the amount of force necessary to move the rear wheel vertically divided by the vertical distance the wheel has moved. The wheel rate can be calculated by dividing the spring rate by the motion ratio.

As illustrated in FIG. 1, the bicycle 10 also includes a front wheel 8 carried by a front suspension assembly, or front fork 12. The fork 12 is secured to the main frame 4 by a handlebar assembly 14. A seat 16 is connected to the frame 2 by a seat post 18, which is received within the seat tube of the main frame 4. The seat 16 provides support for a rider of the bicycle 10. A pedal crank assembly 3 is rotatably supported by the main frame 14 and drives a multi-speed chain drive arrangement 5, as is well known in the art. The bicycle 10 also includes front and rear brake systems 7 for slowing and stopping the bicycle 10. Although the front and rear brakes 7 are illustrated as disc type brakes, alternatively, rim type brakes may be provided, as will be appreciated by one of skill in the art. Rider controls (not shown) are commonly provided on the handlebar assembly 14 and are operable to control shifting of the multi-speed chain drive arrangement 5 and front and rear brake systems 7.

Figure 2:
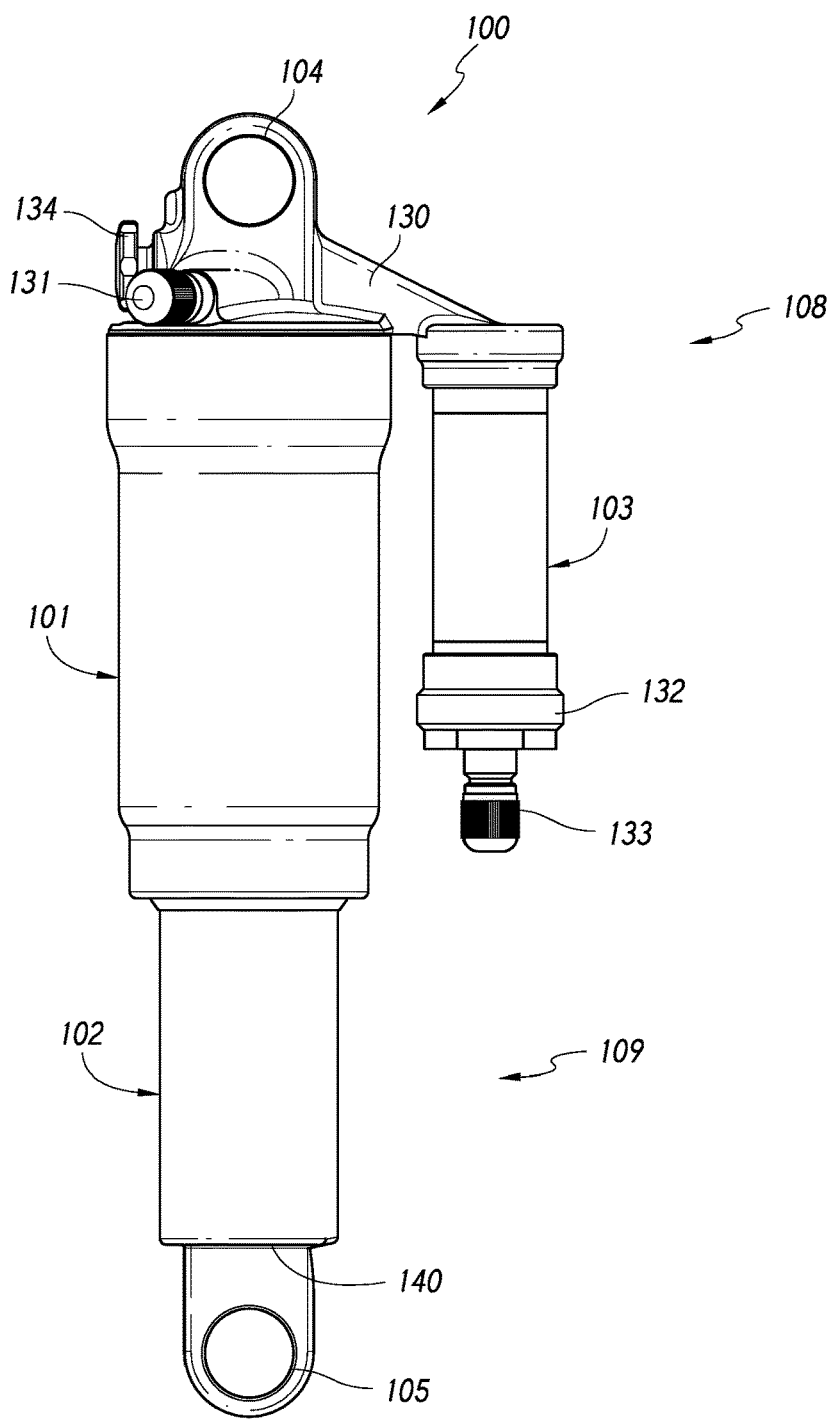
FIG. 2 illustrates a side view of one embodiment of an air spring.

FIG. 2 illustrates a side view of one embodiment of an air spring 100. In some embodiments, the air spring 100 can include a first member 101 and a second member 102. In some embodiments, the first member 101 and second member 102 are substantially cylindrical in shape. The first member 101 can be slideably coupled to the second member 102. The first member 101 can be configured to slideably receive the second member 102. The air spring 100 can also include a first coupling portion, such as a first eyelet 104, and a second coupling portion, such as a second eyelet 105. The first eyelet 104 can be located at a top portion of the air spring 100 and the second eyelet 105 can be located at a bottom portion of the air spring 100. The first eyelet 104 and second eyelet 105 can each be configured to rotatably couple the air spring 100 to the bicycle frame 2 and the subframe 6. In some embodiments, a fastener can be passed through the first eyelet 104 or second eyelet 105 which also passed through a portion of the bicycle frame 2 or subframe 6, securing the air spring 100 to the bicycle frame 2 or subframe 6. In some embodiments, including the embodiment illustrated in FIG. 2, the first eyelet 104 can be affixed to the first member 101 such that the first eyelet 104 is constrained from moving relative to the first member 101 and the second eyelet 105 can be affixed to the second member 102 such that the second eyelet 105 is constrained from moving relative to the second member 102. The "length" of the air spring 100 is defined as the distance from the center of the first eyelet 104 to the center of the second eyelet 105. In some embodiments, the air spring 100 may not incorporate a first eyelet 104 and second eyelet 105, and in such embodiments, the "length" of the air spring is defined as the distance between the axis about which the air spring 100 rotatably couples to the bicycle frame 2 and the axis about which the air spring 100 rotatably couples to the bicycle subframe 6.

In some embodiments, including the embodiment illustrated in FIG. 2, the air spring 100 can include an upper wall, such as a cap 130. The cap 130 can be configured to be affixed to a top portion of the first member 101. The cap 130 can seal the top portion of the first member 101. Methods of affixing the cap 130 to the first member 101 can include, for example, threading, bonding, adhesives, fasteners, etc. In some embodiments, the first eyelet 104 can be formed integrally into the cap 130. In other embodiments, the first eyelet 104 can be affixed to the cap 130. In some embodiments, the second member 102 can include a bottom wall 140 sealing the bottom portion of the second member 102. In some embodiments, the bottom wall 140 can formed integrally with the second member 102. In other embodiments, the second member 102 can include a first portion and a second portion, the bottom wall 140 forming part of the second portion. In some embodiments, the second eyelet 105 can be affixed to the bottom wall 140 of the second member 102. In some embodiments, the first member 101 and the third member 103 have separate caps, coupled together with a rigid or flexible connector.

In some embodiments, the air spring 100 can include a third member 103. In some embodiments, including the embodiment illustrated in FIG. 2, the third member 103 can mounted externally to the first member 101. In some embodiments, the third member 103 can be substantially cylindrical in shape. The third member 103 can be affixed to the cap 130. In some embodiments, a top portion of the third member 103 can be affixed to the cap 130. Methods of affixing the third member 103 to the cap 130 can include, for example, threading, bonding, adhesives, fasteners, etc. In some embodiments, the third member 103 can include a second cap 132 configured to seal the bottom portion of the third member 103. In some embodiments, the second cap 132 can be affixed to the third member 103. Methods of affixing the second cap 132 to the third member 103 can include, for example, threading, bonding, adhesives, fasteners, etc.

In some embodiments, including the embodiment illustrated in FIG. 2, the air spring 100 can include an external valve configured to allow an external pressure source to fluidly couple to at least one pressure chamber located within the air spring 100, and adjust the pressure within the pressure chamber. In some embodiments, the air spring 100 can include a plurality of external valves. In some embodiments the valves can be located in the cap 130. In some embodiments, the valves can be located in the second cap 132. In other embodiments, the valves can be located in other portions of the air spring 100 which may include, for example, the first member 101, second member 102, bottom wall 140, third member 103, etc. In some embodiments, the air spring 100 can include a damping assembly 155 configured to resist compression or extension of the air spring 100 as a function of the velocity of the first member 101 relative to the second member 102. The damping system can include a damping adjuster 134. The damping adjuster 134, as illustrated in FIG. 2, can be located external of the air spring 100. The damping adjuster 134 can be located on the cap 130 of the air spring 100. In other embodiments, the damping adjuster 134 can be located in other portions of the air spring 100 which may include, for example, the first member 101, second member 102, bottom wall 140, third member 103, etc. The damping system can include a plurality of damping adjusters.

Figure 3A:
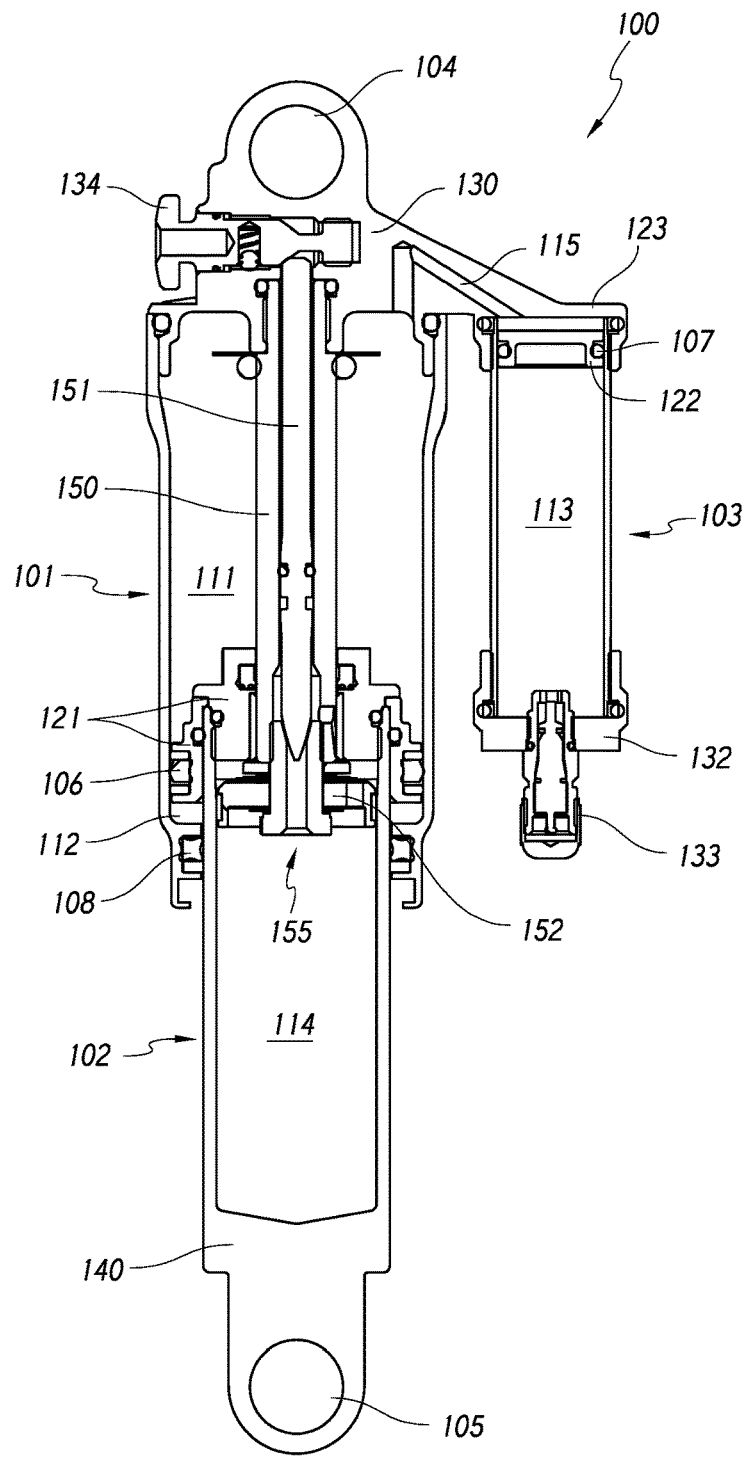
FIG. 3A illustrates a cross section view of the air spring of FIG. 2 in a fully extended position.
Figure 3B:
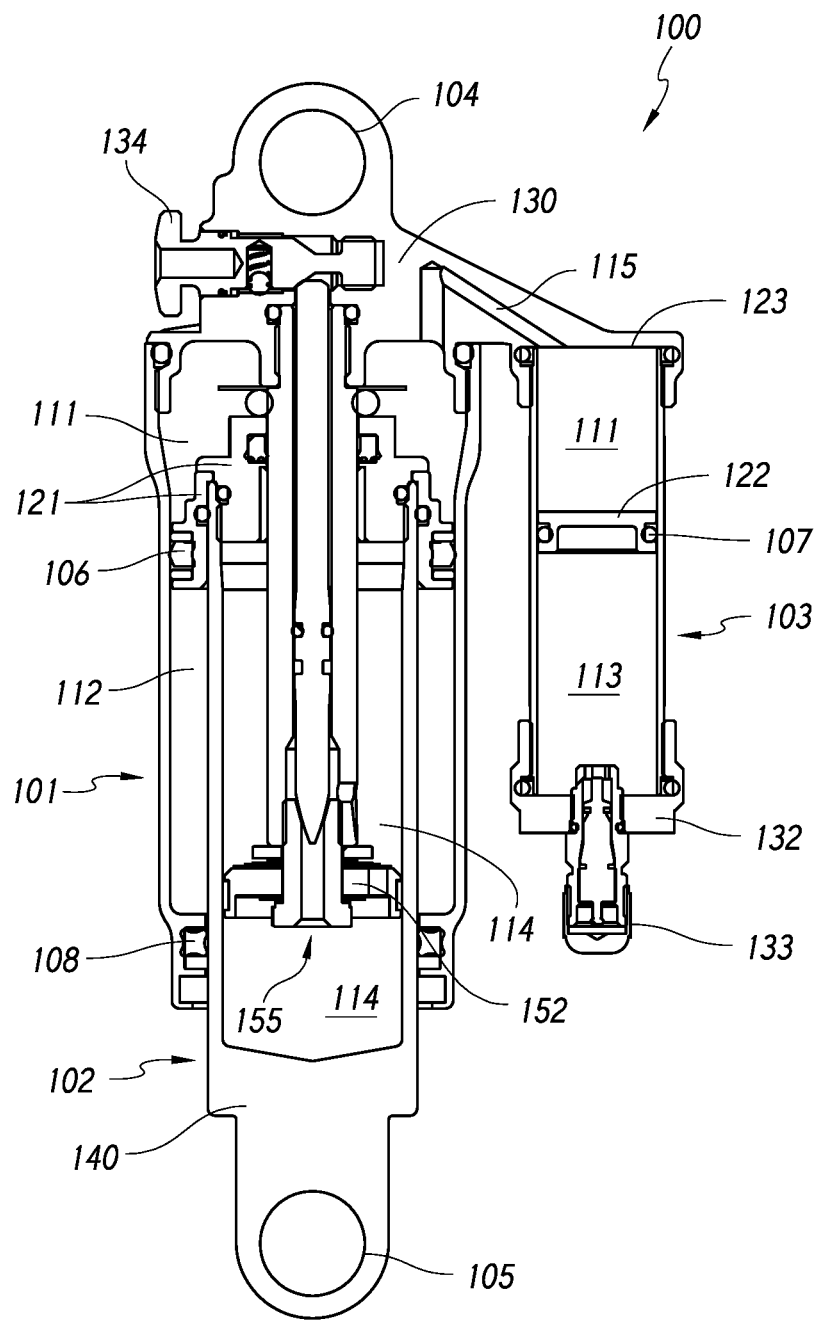
FIG. 3B illustrates a cross section view of the air spring of FIG. 2 in a fully compressed position.
Figure 3C:
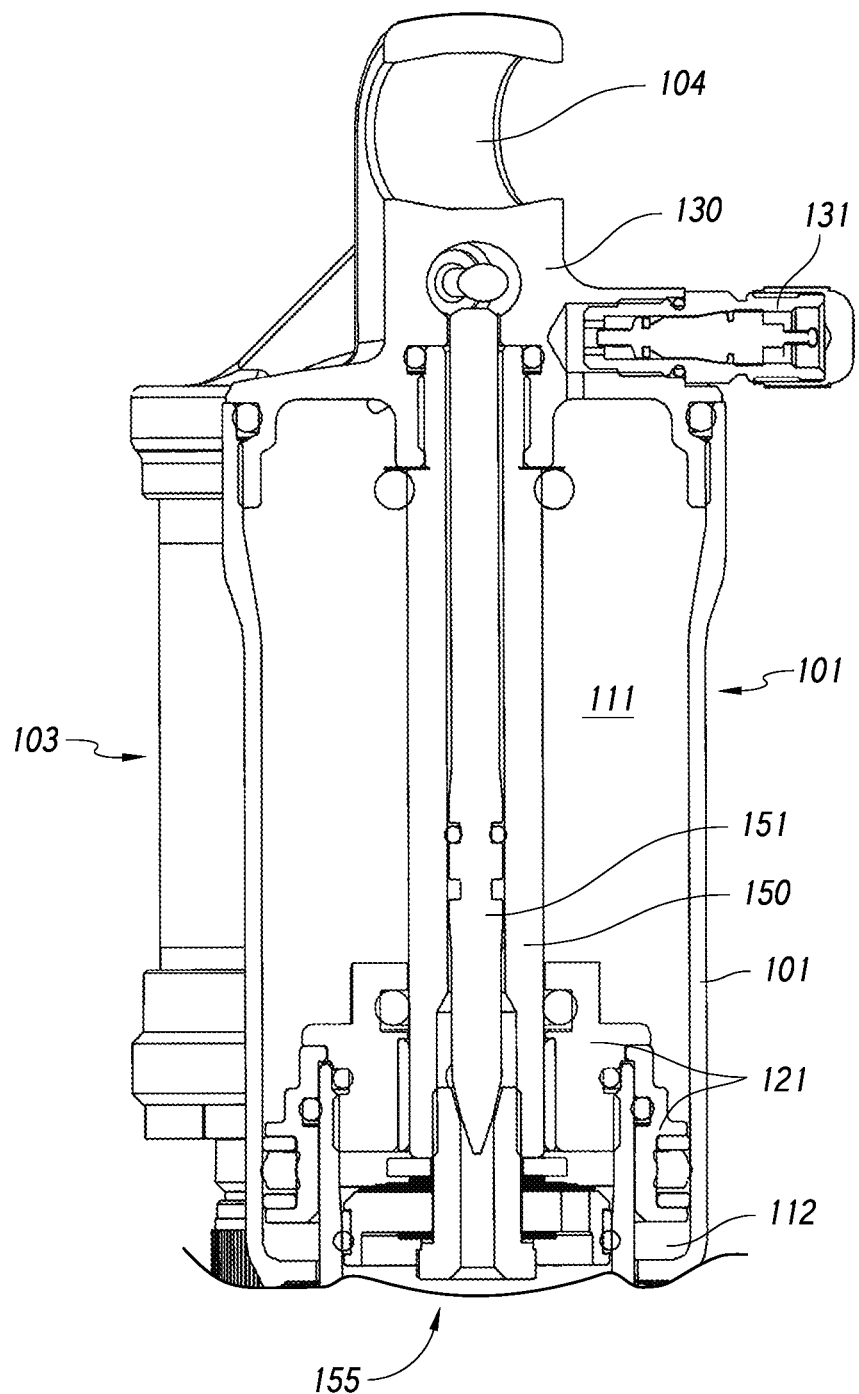
FIG. 3C illustrates a partial cross section view of the air spring of FIG. 2.

FIG. 3A illustrates a cross section view of the air spring 100 of FIG. 2 in a fully extended position. FIG. 3B illustrates a cross section view of the air spring 100 of FIG. 2 in a fully compressed position. FIG. 3C illustrates a partial cross section view of the air spring 100 of FIG. 2. In some embodiments, the air spring 100 can include a pressurized chamber within the air spring 100. A "pressurized chamber," as described herein, shall be defined as a portion of the air spring 100 substantially sealed from other portions of the air spring 100 by at least one piston, during at least a portion of the range of motion of the air spring 100. A pressurized chamber can be surrounded by one or more walls. In some embodiments, a pressurized chamber can be substituted with a different type of spring, which may include for example, a coil spring. A "piston," as described herein, shall be defined as a member configured to slide relative to a surrounding wall, typically a cylindrical wall, the member including a means for sealing against the surrounding wall such that the member forms an air tight seal between a first chamber on a first side of the piston and a second chamber on a second side of the piston, the first side being opposite the second side. In some embodiments, the air spring 100 can include a plurality of pressurized chambers. In some embodiments, the air spring 100 can include a piston. In some embodiments, the air spring 100 can include a plurality of pistons.

In some embodiments, including the embodiment illustrated in FIG. 3A, the second member 102 can be slideably received within the first member 101. In other embodiments, the first member 101 can be slideably received within the first member 101. The air spring 100 can be configured such that the second member 102 slides towards the first member 101, upwards when viewed from the perspective of FIG. 3A, when the air spring 100 is compressed, and away from the first member 101, downwards when viewed from the perspective of FIG. 3A, when the air spring 100 is extended. In some embodiments, the first eyelet 104 is furthest from the second eyelet 105 when the air spring 100 is in a fully extended position, as illustrated in FIG. 3A, and the first eyelet 104 is closest to the second eyelet 105 when the air spring 100 is in a fully compressed position, as illustrated in FIG. 3B. In some embodiments, including the embodiment illustrated in FIG. 3A, the first member 101 can include a sealing member 108 configured to seal the first member 101 to the second member 102 as the second member 102 slides relative to the first member 101.

In some embodiments, the air spring 100 can include a first piston 121. The first piston 121 can be affixed to the second member 102 of the of the air spring 100, such that when the second member 102 slides relative to the first member 101, the first piston 121 moves with the second member 102. The first piston 121 can be affixed to the top of the second member 102. The first piston 121 can be configured to slide within the first member 101 and seal against the first member 101. The first piston 121 can include a sealing member 106 configured to seal against the first member 101 of the air spring 100. In some embodiments, the first piston 121 can include a plurality of sealing members 106. In some embodiments, the first piston can 121 comprise more than one piece affixed to one another.

In some embodiments, including the embodiment illustrated in FIG. 3A, the air spring 100 can include a first pressurized chamber, such as a primary chamber 111. In some embodiments, the primary chamber 111 can be disposed within the first member 101 of the air spring 100. The primary chamber 111 can be pressurized with a gas, which may include for example, air. The first piston 121 can be adjacent the primary chamber 111. "Adjacent," when used herein to describe the relationship between a piston and a pressurized chamber, shall characterize an arrangement wherein one side of the piston is exposed to the pressurized gas within the pressurized chamber such that the pressure exerts a force against the one side of the piston. The first piston 121 can be disposed at a first end, such as the bottom end, of the primary chamber 111. A piston being described herein as being disposed at one end of a pressurized chamber shall characterize an arrangement wherein one side of the piston is exposed to the pressurized gas within the pressurized chamber such that the pressure exerts a force against the one side of the piston. The air spring 100 can be configured such that when air spring 100 is compressed, as illustrated in FIG. 3B, and the second member 102 slides towards the first member 101, the first piston 121 is configured to slide towards the primary chamber 111 and decrease the volume of the primary chamber 111. The primary chamber 111 can be pressurized such that the pressurized gas within the primary chamber 111 exerts a force on a first side, such as the top side as illustrated in FIG. 3A, of the first piston 121, forcing the first piston 121 and second member 102 away from the first member 101 and the air spring 100 towards a fully extended position. As the air spring 100 is compressed, the volume of the primary chamber 111 can decrease, increasing the pressure within the primary chamber 111, and increasing the force which the primary chamber 111 exerts on the first piston 121. In some embodiments, the primary chamber 111 can include a primary chamber valve 131, as illustrated in FIG. 3C, configured to allow an external pressure source to fluidly couple to the primary chamber 111 and adjust the pressure within the primary chamber 111. By adjusting the pressure within the primary chamber 111, the shape of the spring curve can be manipulated.

In some embodiments, including the embodiment illustrated in FIG. 3A, the air spring 100 can include a second pressurized chamber, such as a negative chamber 112. In some embodiments, the negative chamber 112 can be disposed within the first member 101 of the air spring 100. The negative chamber 112 can be pressurized with a gas. The negative chamber 112 can be adjacent the first piston 121, opposite the primary chamber 111. The air spring 100 can be configured such that when the air spring 100 is compressed, the first piston 121 is configured to slide away from the negative chamber 112 and increase the volume of the negative chamber 112. The negative chamber 112 can be pressurized such that the pressurized gas within the negative chamber 112 exerts a force on a second side, such as the bottom side as illustrated in FIG. 3A, of the first piston 121, forcing the first piston 121 and second member 102 towards the first member 101 and the air spring 100 towards a fully compressed position. The negative chamber 112 can be configured to desirably decrease the spring rate of the air spring 100 when the air spring 100 is near a fully extended position.

In some embodiments, the air spring 100 can be configured such that as the air spring 100 compresses from a fully extended position, as illustrated in FIG. 3A, to a fully compressed position, as illustrated in FIG. 3B, the effect of the negative chamber 112 on the spring rate of the air spring 100 is reduced. In some embodiments, not illustrated in the figures, the air spring 100 can include vents or channels which fluidly connect the negative chamber 112 to another chamber within the air spring 100, such as the primary chamber 111, during a portion of the range of motion of the air spring 100. In some embodiments, the range of motion of the air spring 100 can include two portions, a compressed portion nearest the fully compressed position, and an extended portion nearest the fully extended position. In some embodiments, the vents or channels fluidly connect the negative chamber 112 to another chamber when the air spring 100 is in the compressed portion of the range of motion of the air spring 100 and do not connect the negative chamber 112 to another chamber of the air spring 100 when the air spring 100 is in the extended portion of the range of motion of the air spring 100. In some embodiments, the vents or channels can include a one way valve such that gas can only travel through the vents or channels in one direction. In some embodiments, the vents or channels can be similar to the bypass channel described in U.S. Pat. No. 8,480,064, which is hereby incorporated by reference in its entirety. In some embodiments, the air spring 100 can include a negative chamber valve configured to allow an external pressure source to fluidly couple to the negative chamber 112 and adjust the pressure within the negative chamber 112. By adjusting the pressure within the negative chamber 112, the shape of the spring curve can be manipulated.

In some embodiments, the air spring 100 can include a second piston 122. The second piston 122 can be configured to slide within the air spring 100. In some embodiments, including the embodiment illustrated in FIG. 3A, the second piston 122 can be configured to slide within the third member 103 and seal against the third member 103. The second piston 122 can include a sealing member 107 configured to seal against the third member 103 of the air spring 100. In some embodiments, the primary chamber 111 can be at least partially disposed within the third member 103 as well as the first member 101. In some embodiments, the primary chamber 111 can include a primary chamber extension portion 115, which may include for example, a hollow channel, which fluidly connects the portion of the primary chamber 111 within the first member 101 to the portion of the primary chamber 111 within the third member 103. In some embodiments, the primary chamber extension portion 115 can be formed in the cap 130 of the air spring 100. In some embodiments, the second piston 122 can be adjacent the primary chamber 111.

In some embodiments, including the embodiment illustrated in FIG. 3A, the air spring 100 can include a third pressurized chamber, such as a compensation chamber 113. In some embodiments, the compensation chamber 113 can be disposed within the third member 103 of the air spring 100. The compensation chamber 113 can be pressurized with a gas. The second piston 122 can be adjacent the compensation chamber 113. The second piston 122 can be disposed at a first end, such as the top end, of the compensation chamber 113. The pressurized gas within the primary chamber 111 can exert a force on a first side of the second piston 122, the top side for example as illustrated in FIG. 3A, forcing the second piston 122 away from the primary chamber 111 and towards the compensation chamber 113. The pressurized gas within the compensation chamber 113 can exert a force on a second side of the second piston 122, the bottom side for example as illustrated in FIG. 3A, forcing the second piston 122 away from the compensation chamber 113 and towards the primary chamber 111. The air spring 100 can be configured such that as the pressure in the primary chamber 111 increases, the pressurized gas within the primary chamber 111 can force the second piston 122 to slide towards the compensation chamber 113, increasing the volume of the primary chamber 111 and decreasing the volume of the compensation chamber 113.

In some embodiments, the air spring 100 can include a retaining portion 123 configured to limit displacement of the second piston 122 away from the compensation chamber 113 and towards the primary chamber 111. In some embodiments, the retaining portion 123 can comprise a wall, which may include for example, a portion of the cap 130, limiting the travel of the second piston 122. In some embodiments, the retaining portion 123 can comprise a protrusion from the wall of the chamber within which the second piston 122 is sliding. In some embodiments, the retaining portion 123 can comprise a protrusion from a rod or shaft on which the second piston 122 is sliding. In some embodiments, the second piston 122 can include an engaging portion configured to cooperate with the retaining portion 123 and prevent the second piston 122 from sliding away from the compensation chamber 113 and towards the primary chamber 111. In some embodiments, the retaining portion 123 can include non-physical means for limiting the travel of the second piston 122, which may include for example, magnetic force.

In some embodiments, the retaining portion 123 can allow the pressure of the compensation chamber 113 to be set higher than the pressure in the primary chamber 111 when the air spring 100 is in a fully extended position. In some embodiments, when the air spring 100 is compressed from a fully extended position, as illustrated in FIG. 3A, towards a fully compressed position, as illustrated in FIG. 3B, the pressure of the primary chamber 111 can increase due to the first piston 121 reducing the volume of the primary chamber 111. The second piston 122 can remain in a retained position, forced against the retaining portion 123 by the pressurized gas of the compensation chamber 113, until the pressure in the primary chamber 111 is greater than the pressure in the compensation chamber 113. When the pressure in the primary chamber 111 is greater than the pressure in the compensation chamber 113, the second piston 122 can move away from primary chamber 111 and towards the compensation chamber 113, increasing the volume of the primary chamber 111 and decreasing the volume of the compensation chamber 113. The reduction in volume of the primary chamber 111 can desirably change the shape of the spring curve compared to an air spring 100 that does not include a second piston 122 and compensation chamber 113.

In some embodiments, due to the second piston 122 remaining in the retained position and not changing the volume of the primary chamber 111 until the pressure of the primary chamber 111 reaches the pressure of the compensation chamber 113, the spring curve can be selectively modified in the compressed portion of the range of motion of the air spring 100. In some embodiments, the air spring 100 can include a compensation chamber valve 133 configured to allow an external pressure source to fluidly couple to the compensation chamber 113 and adjust the pressure within the compensation chamber 113. By adjusting the pressure within the compensation chamber 113, the shape of the spring curve can be manipulated. When the pressure of the compensation chamber 113 is increased, the pressure of the primary chamber 111 at which the second piston 122 moves from the retained position can be adjusted. Since the pressure of the primary chamber 111 is, at least in part, a function of the location of the first piston 121, and thus the second member 102, in relation to the first member 101, the pressure in the compensation chamber 113 can affect the point in the range of motion of the air spring 100 at which the second piston 122 moves from the retained position, also the point at which the volume of the primary chamber 111 is increased, and thus the point at which the spring rate is effected by the reduction of pressure in the primary chamber 111. In some embodiments, the compensation chamber 113 can decrease the rate of pressure change within the primary chamber 111 during compression of the air spring 100. In some embodiments, adjusting the pressure within the compensation chamber 113 can affect the rate of pressure change within the primary chamber 111 during compression of the air spring 100. Changing the pressure in the primary chamber 111 through the primary chamber valve 131 can affect the point at which the second piston 122 moves from the retained position.

In some embodiments, the first piston 121 can have an outer diameter. The outer diameter of the first piston 121 can be substantially similar to the inner diameter of the first member 101. The outer diameter of the first piston 121 can be substantially similar to the diameter of the primary chamber 111. In some embodiments, the second piston 122 can have an outer diameter. The outer diameter of the second piston 122 can be substantially similar to the inner diameter of the third member 103. The outer diameter of the second piston 122 can be substantially similar to the diameter of the compensation chamber 113. In some embodiments, the outer diameter of the first piston 121 can be substantially similar to the outer diameter of the second piston 122. In some embodiments, the outer diameter of the first piston 121 can be greater than the outer diameter of the second piston 122. In some embodiments, the outer diameter of the second piston 122 can be greater than the outer diameter of the first piston 121. In some embodiments, the outer diameter of the first piston 121 can be greater than 110% of the outer diameter of the second piston 122. In some embodiments, the outer diameter of the first piston 121 can be greater than 120% of the outer diameter of the second piston 122. In some embodiments, the outer diameter of the first piston 121 can be greater than 130% of the outer diameter of the second piston 122. In some embodiments, the outer diameter of the first piston 121 can be greater than 140% of the outer diameter of the second piston 122. In some embodiments, the outer diameter of the first piston 121 can be greater than 150% of the outer diameter of the second piston 122. In some embodiments, the outer diameter of the first piston 121 can be greater than 160% of the outer diameter of the second piston 122. In some embodiments, the outer diameter of the first piston 121 can be greater than 170% of the outer diameter of the second piston 122. In some embodiments, the outer diameter of the first piston 121 can be greater than 180% of the outer diameter of the second piston 122. In some embodiments, the outer diameter of the second piston 122 can be greater than 110% of the outer diameter of the first piston 121. In some embodiments, the outer diameter of the second piston 122 can be greater than 120% of the outer diameter of the first piston 121. In some embodiments, the outer diameter of the second piston 122 can be greater than 130% of the outer diameter of the first piston 121. In some embodiments, the outer diameter of the second piston 122 can be greater than 140% of the outer diameter of the first piston 121. In some embodiments, the outer diameter of the second piston 122 can be greater than 150% of the outer diameter of the first piston 121. In some embodiments, the outer diameter of the second piston 122 can be greater than 160% of the outer diameter of the first piston 121. In some embodiments, the outer diameter of the second piston 122 can be greater than 170% of the outer diameter of the first piston 121. In some embodiments, the outer diameter of the second piston 122 can be greater than 180% of the outer diameter of the first piston 121.

In some embodiments, the first piston 121 can have a primary chamber surface area comprising the surface area adjacent the primary chamber 111 along a plane perpendicular to the axis along which the first piston 121 can slide. In some embodiments, the second piston 122 can have a primary chamber surface area comprising the surface area adjacent the primary chamber 111 along a plane perpendicular to the axis along which the second piston 122 can slide. In some embodiments, the primary chamber surface area of the first piston 121 can be substantially similar to the primary chamber surface area of the second piston 122. In some embodiments, the primary chamber surface area of the first piston 121 can be greater than the primary chamber surface area of the second piston 122. In some embodiments, the primary chamber surface area of the second piston 122 can be greater than the primary chamber surface area of the first piston 121. In some embodiments, the primary chamber surface area of the first piston 121 can be greater than 120% of the primary chamber surface area of the second piston 122. In some embodiments, the primary chamber surface area of the first piston 121 can be greater than 140% of the primary chamber surface area of the second piston 122. In some embodiments, the primary chamber surface area of the first piston 121 can be greater than 160% of the primary chamber surface area of the second piston 122. In some embodiments, the primary chamber surface area of the first piston 121 can be greater than 180% of the primary chamber surface area of the second piston 122. In some embodiments, the primary chamber surface area of the first piston 121 can be greater than 200% of the primary chamber surface area of the second piston 122. In some embodiments, the primary chamber surface area of the first piston 121 can be greater than 220% of the primary chamber surface area of the second piston 122. In some embodiments, the primary chamber surface area of the first piston 121 can be greater than 240% of the primary chamber surface area of the second piston 122. In some embodiments, the primary chamber surface area of the first piston 121 can be greater than 260% of the primary chamber surface area of the second piston 122. In some embodiments, the primary chamber surface area of the first piston 121 can be greater than 280% of the primary chamber surface area of the second piston 122. In some embodiments, the primary chamber surface area of the first piston 121 can be greater than 300% of the primary chamber surface area of the second piston 122. In some embodiments, the primary chamber surface area of the second piston 122 can be greater than 120% of the primary chamber surface area of the first piston 121. In some embodiments, the primary chamber surface area of the second piston 122 can be greater than 140% of the primary chamber surface area of the first piston 121. In some embodiments, the primary chamber surface area of the second piston 122 can be greater than 160% of the primary chamber surface area of the first piston 121. In some embodiments, the primary chamber surface area of the second piston 122 can be greater than 180% of the primary chamber surface area of the first piston 121. In some embodiments, the primary chamber surface area of the second piston 122 can be greater than 200% of the primary chamber surface area of the first piston 121. In some embodiments, the primary chamber surface area of the second piston 122 can be greater than 220% of the primary chamber surface area of the first piston 121. In some embodiments, the primary chamber surface area of the second piston 122 can be greater than 240% of the primary chamber surface area of the first piston 121. In some embodiments, the primary chamber surface area of the second piston 122 can be greater than 260% of the primary chamber surface area of the first piston 121. In some embodiments, the primary chamber surface area of the second piston 122 can be greater than 280% of the primary chamber surface area of the first piston 121. In some embodiments, the primary chamber surface area of the second piston 122 can be greater than 300% of the primary chamber surface area of the first piston 121.

Due to the adiabatic effect, the pressure in the primary chamber 111 can be, at least in part, a function of the velocity of the compression or extension of the air spring 100. An adiabatic process is a process occurring without exchange of heat of a system with its environment. When the gas within the air spring 100 is compressed, heat is produced. At high velocities, the gas within the air spring 100 can be compressed in such a short amount of time, that there is little to no opportunity for significant heat exchange between the gas and the environment. Thus, the temperature of the gas within the air spring 100 can increase, resulting in expansion of the gas, and typically resulting in a higher spring rate. Mountain bicycles 10 are often utilized on bumpy terrain which can produce high velocities at the air spring 100. The adiabatic effect can result in undesirable spikes in the spring rate of the air spring 100 during these instances of high air spring velocity. The compensation chamber 113 can help to dampen the effects of the adiabatic effect. During an instance of high first piston 121 velocity creating a pressure spike in the primary chamber 111, the pressure in the primary chamber 111 may rise above the pressure in the compensation chamber 113, even though the air spring 100 may not have compressed to the point at which the second piston 122 would move from the retained position in the absence of the adiabatic effect. When the pressure of the primary chamber 111 rises above the pressure of the compensation chamber 113, the second piston 122 can move from the retained position, increasing the volume of the primary chamber 111, thus reducing the pressure in the primary chamber 111 and reducing the effects of the pressure spike on the spring rate of the air spring 100 produced by the adiabatic effect.

In some embodiments, including the embodiment illustrated in FIG. 3A, the air spring 100 can include a damping assembly 155. The damping assembly 155 can include a damping fixation shaft 150. The damping fixation shaft 150 can be disposed within the first member 101 of the air spring 100. In some embodiments, including the embodiment illustrated in FIG. 3A, the first piston 121 of the air spring 100 can include an aperture configured to accept the damping fixation shaft 150. The first piston 121 can include a sealing member configured to seal the first piston 121 to the damping fixation shaft 150 as the first piston 121 slides within the air spring 100. The damping fixation shaft 150 can be affixed to the cap 130, and thus restrained from moving relative to the first member 101. The second member 102 can include a damping chamber 114, which contains a damping fluid, which may include for example, a noncompressible fluid. The damping system can include a damping member 152, such as a damping piston. The damping member 152 can include at least one orifice and can be configured to slide within the damping chamber 114. The damping member 152 can be disposed within the second member 102 of the air spring 100. The damping member 152 can be affixed to one end of the damping fixation shaft 150, such as the bottom end of the damping fixation shaft 150 as illustrated in FIG. 3A. The damping fluid can be forced through the damping member 152 as the second member 102 moves relative to the first member 101, and thus relative to the damping member 152. The damping system can also include a damping adjustment rod 151 and a damping adjuster 134. The damping adjuster 134 can include an external mechanism providing for external adjustment of the damping assembly 155. The damping adjuster 134 can manipulate the damping adjustment rod 151 such that the damping adjustment rod 151 can manipulate at least one orifice in the damping member 152, thus affecting the flow of damping fluid through the damping member 152, and thus the damping force exerted by the damping system. The damping fixation shaft 150 can be hollow and include a channel within the damping fixation shaft 150. The damping adjustment rod 151 can be disposed within the channel of the damping fixation shaft 150. The damping member 152 can include additional valves, such as shims.

In some embodiments, the amount of extension force each spring exerts, as a function of displacement, the distance each spring has been compressed, can be represented by a spring curve. The instantaneous slope of the spring curve represents the spring rate of that spring at that particular displacement. The spring curve can be separated into three portions, an "initial zone" comprising the first 30% of displacement, the "bump zone" comprising the middle 30% to 70% of displacement, and an "ending zone" comprising the final 70% to 100% of displacement. The spring curve of a standard coil spring curve is typically linear, which can be a desirable characteristic, throughout the initial zone, bump zone, and ending zone. The pressurized negative chamber 112 of the air spring 100 can be configured to produce a lower spring rate at the beginning of the spring curve in the initial zone. In the bump zone, the negative chamber can be configured to no longer substantially affect the spring curve. In the bump zone, the primary chamber 111 and compensation chamber 113 can work together to closely follow the desired bump zone curve of a standard coil spring. In the ending zone, the spring rate can increase providing additional resistance to bottoming out the air spring 100 during large impacts. The compensation chamber 113 allows the ending zone of the air spring 100 curve to be adjusted without substantially affecting the shape of the curve in the bump zone.

In some embodiments, the shape of the spring curve of the air spring 100 can be manipulated by adjusting the pressure in one or more of the pressurized chambers via one of the chamber valves. The shape of the entire curve, and particularly the slope of the curve within the bump zone, can be adjusted by adjusting the pressure within the primary chamber 111 of the air spring 100. Increasing the pressure in the primary chamber 111 can increase the spring rate and the slope of the spring curve. Lowering the pressure in the primary chamber 111 can decrease the spring rate and the slope of the spring curve. The shape of the curve in the initial zone, and particularly the portion nearest the fully extended position, can be manipulated by adjusting the pressure in the negative chamber 112. Increasing the pressure in the negative chamber 112 can reduce the amount of force necessary to move the air spring 100 from a fully extended position. Decreasing the pressure in the negative chamber 112 can reduce that effect. The shape of the curve in the ending zone, and depending on the pressures of the configuration and pressures of the primary chamber 111 and compensation chamber 113, possibly also the bump zone, can be manipulated by adjusting the pressure in the compensation chamber 113. Increasing the pressure in the compensation chamber 113 can shift the displacement at which the second piston 122 moves from the retained position, and thus softens the spring rate of the air spring 100, closer to the fully extended position. Increasing the pressure in the compensation chamber 113 can reduce the effect of the compensation chamber 113. Decreasing the pressure in the compensation chamber 113 can shift the displacement at which the second piston 122 moves from the retained position, and thus softens the spring rate of the air spring 100, closer to the fully compressed position. In some embodiments, the pressures of the various air chambers can each be adjusted independently to manipulate a particular portion of the spring curve.

In some embodiments, the air spring 100 can be configured to provide the desired wheel rate, when installed in a bicycle 10 with a particular motion ratio. In some embodiments, the air spring 100 can be configured to be installed in a bicycle 10 with a motion ratio greater than 1. In some embodiments, the air spring 100 can be configured to be installed in a bicycle 10 with a motion ratio greater than 1.25. In some embodiments, the air spring 100 can be configured to be installed in a bicycle 10 with a motion ratio greater than 1.5. In some embodiments, the air spring 100 can be configured to be installed in a bicycle 10 with a motion ratio greater than 1.75. In some embodiments, the air spring 100 can be configured to be installed in a bicycle 10 with a motion ratio greater than 2. In some embodiments, the air spring 100 can be configured to be installed in a bicycle 10 with a motion ratio greater than 2.25. In some embodiments, the air spring 100 can be configured to be installed in a bicycle 10 with a motion ratio greater than 2.5. In some embodiments, the air spring 100 can be configured to be installed in a bicycle 10 with a motion ratio greater than 2.75. In some embodiments, the air spring 100 can be configured to be installed in a bicycle 10 with a motion ratio greater than 3. In some embodiments, the air spring 100 can be configured to be installed in a bicycle 10 with a motion ratio between 1 and 3. In some embodiments, the air spring 100 can be configured to be installed in a bicycle 10 with a motion ratio between 1.5 and 3. In some embodiments, the air spring 100 can be configured to be installed in a bicycle 10 with a motion ratio between 1.75 and 3. In some embodiments, the air spring 100 can be configured to be installed in a bicycle 10 with a motion ratio between 2 and 3. In some embodiments, the air spring 100 can be configured to be installed in a bicycle 10 with a motion ratio between 2.25 and 3. In some embodiments, the air spring 100 can be configured to be installed in a bicycle 10 with a motion ratio between 2.25 and 2.75. In some embodiments, the air spring 100 can be configured to be installed in a bicycle 10 with a motion ratio between 2.25 and 2.5.

In some embodiments, the air spring 100 can be configured to provide a desired spring rate. In some embodiments, the air spring 100 can be configured to provide a desired average spring rate over a particular portion of the curve. In some embodiments, the air spring 100 can be configured to provide a desired average spring rate in the bump zone of the spring curve. In some embodiments, the air spring 100 can be configured to provide an average spring rate greater than 2 pounds/millimeter (lbs./mm) in the bump zone of the spring curve. In some embodiments, the air spring 100 can be configured to provide an average spring rate greater than 4 pounds/millimeter (lbs./mm) in the bump zone of the spring curve. In some embodiments, the air spring 100 can be configured to provide an average spring rate greater than 6 pounds/millimeter (lbs./mm) in the bump zone of the spring curve. In some embodiments, the air spring 100 can be configured to provide an average spring rate greater than 8 lbs./mm in the bump zone of the spring curve. In some embodiments, the air spring 100 can be configured to provide an average spring rate greater than 10 lbs./mm in the bump zone of the spring curve. In some embodiments, the air spring 100 can be configured to provide an average spring rate greater than 12 lbs./mm in the bump zone of the spring curve. In some embodiments, the air spring 100 can be configured to provide an average spring rate greater than 14 lbs./mm in the bump zone of the spring curve. In some embodiments, the air spring 100 can be configured to provide an average spring rate greater than 16 lbs./mm in the bump zone of the spring curve. In some embodiments, the air spring 100 can be configured to provide an average spring rate greater than 18 lbs./mm in the bump zone of the spring curve. In some embodiments, the air spring 100 can be configured to provide an average spring rate greater than 20 lbs./mm in the bump zone of the spring curve. In some embodiments, the air spring 100 can be configured to provide an average spring rate greater than 22 lbs./mm in the bump zone of the spring curve. In some embodiments, the air spring 100 can be configured to provide an average spring rate greater than 24 lbs./mm in the bump zone of the spring curve. In some embodiments, the air spring 100 can be configured to provide an average spring rate greater than 26 lbs./mm in the bump zone of the spring curve. In some embodiments, the air spring 100 can be configured to provide an average spring rate greater than 28 lbs./mm in the bump zone of the spring curve. In some embodiments, the air spring 100 can be configured to provide an average spring rate greater than 30 lbs./mm in the bump zone of the spring curve.

In some embodiments, the air spring 100 can be configured to provide an average spring rate between 2 lbs./mm and 30 lbs./mm in the bump zone of the spring curve. In some embodiments, the air spring 100 can be configured to provide an average spring rate between 4 lbs./mm and 28 lbs./mm in the bump zone of the spring curve. In some embodiments, the air spring 100 can be configured to provide an average spring rate between 6 lbs./mm and 26 lbs./mm in the bump zone of the spring curve. In some embodiments, the air spring 100 can be configured to provide an average spring rate between 8 lbs./mm and 24 lbs./mm in the bump zone of the spring curve. In some embodiments, the air spring 100 can be configured to provide an average spring rate between 10 lbs./mm and 22 lbs./mm in the bump zone of the spring curve. In some embodiments, the air spring 100 can be configured to provide an average spring rate between 12 lbs./mm and 20 lbs./mm in the bump zone of the spring curve. In some embodiments, the air spring 100 can be configured to provide an average spring rate between 14 lbs./mm and 18 lbs./mm in the bump zone of the spring curve.

Figure 4A:
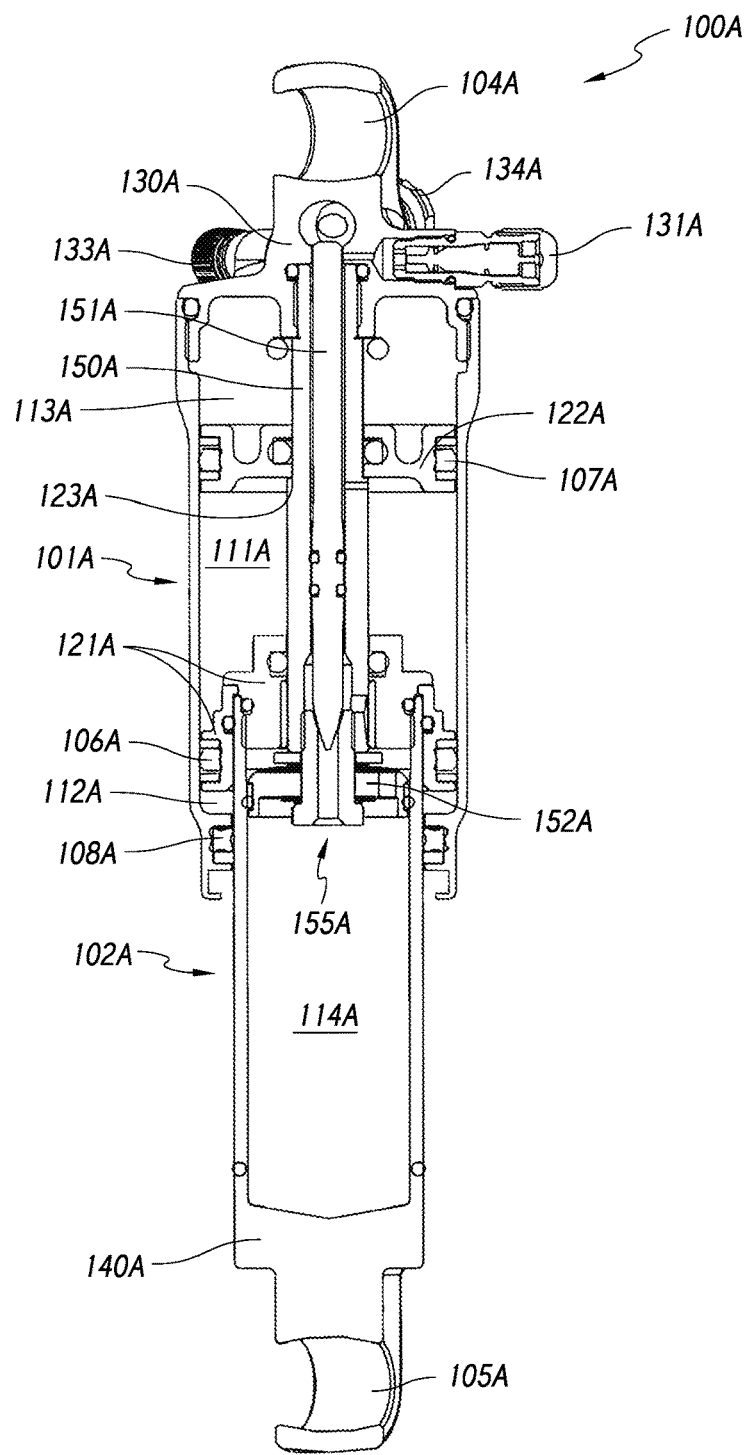
FIG. 4A illustrates a cross section view of one embodiment of an air spring in a fully extended position.

FIG. 4A illustrates a cross section view of one embodiment of an air spring 100A in a fully extended position. In some embodiments, the air spring 100A can include a second piston 122A. The second piston 122A can be configured to slide within the air spring 100A. In some embodiments, including the embodiment illustrated in FIG. 4A, the second piston 122A can be configured to slide within the first member 101A and seal against the first member 101A. The second piston 122A can include a sealing member 107A configured to seal against the first member 101A of the air spring 100A. In some embodiments, the second piston 122A can be adjacent the primary chamber 111A. In some embodiments, the first piston 121A can be disposed at a first end of the primary chamber 111A and the second piston 122A can be disposed at a second end of the primary chamber 111A. In some embodiments, the first end of the primary chamber 111A can be opposite the second end of the primary chamber 111A.

In some embodiments, including the embodiment illustrated in FIG. 4A, the air spring 100A can include a third pressurized chamber, such as a compensation chamber 113A. In some embodiments, the compensation chamber 113A can be disposed within the first member 101A of the air spring 100A. The compensation chamber 113A can be pressurized with a gas. The second piston 122A can be adjacent the compensation chamber 113A. The second piston 122A can be disposed at a first end, such as the top end, of the compensation chamber 113A. The pressurized gas within the primary chamber 111A can exert a force on a first side of the second piston 122A, the bottom side for example as illustrated in FIG. 4A, forcing the second piston 122A away from the primary chamber 111 and towards the compensation chamber 113A. The pressurized gas within the compensation chamber 113A can exert a force on a second side of the second piston 122A, the top side for example as illustrated in FIG. 3A, forcing the second piston 122A away from the compensation chamber 113A and towards the primary chamber 111A. The air spring 100A can be configured such that as the pressure in the primary chamber 111A increases, the pressurized gas within the primary chamber 111A can force the second piston 122A to slide towards the compensation chamber 113A, increasing the volume of the primary chamber 111A and decreasing the volume of the compensation chamber 113A.

In some embodiments, the air spring 100A can include a retaining portion 123A configured to limit displacement of the second piston 122A away from the compensation chamber 113A and towards the primary chamber 111A. In some embodiments, including the embodiment illustrated in FIG. 4A, the retaining portion 123A can comprise a protrusion or ledge from a rod or shaft on which the second piston 122 is sliding. In some embodiments, the second piston 122A can include an aperture configure to accept a shaft, such as the damping fixation shaft 150A. In some embodiments, the retaining portion 123A can comprise a protrusion from the damping fixation shaft 150A. In some embodiments, the protrusion can prevent the second piston 122A from sliding towards the primary chamber once the second piston 122A has engaged the retaining portion 123A.

Figure 4B:
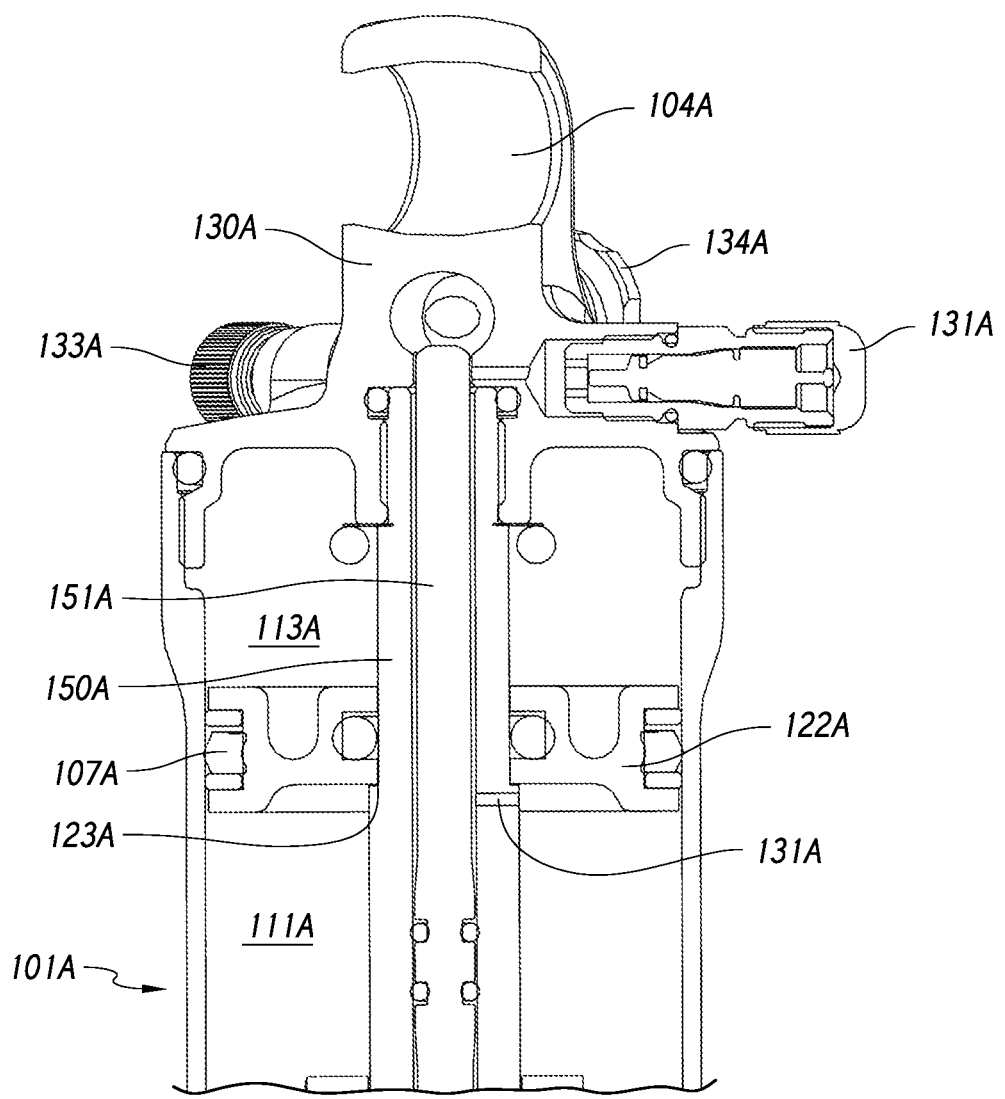
FIG. 4B illustrates a partial cross section view of the air spring of FIG. 4A.
Figure 4C:
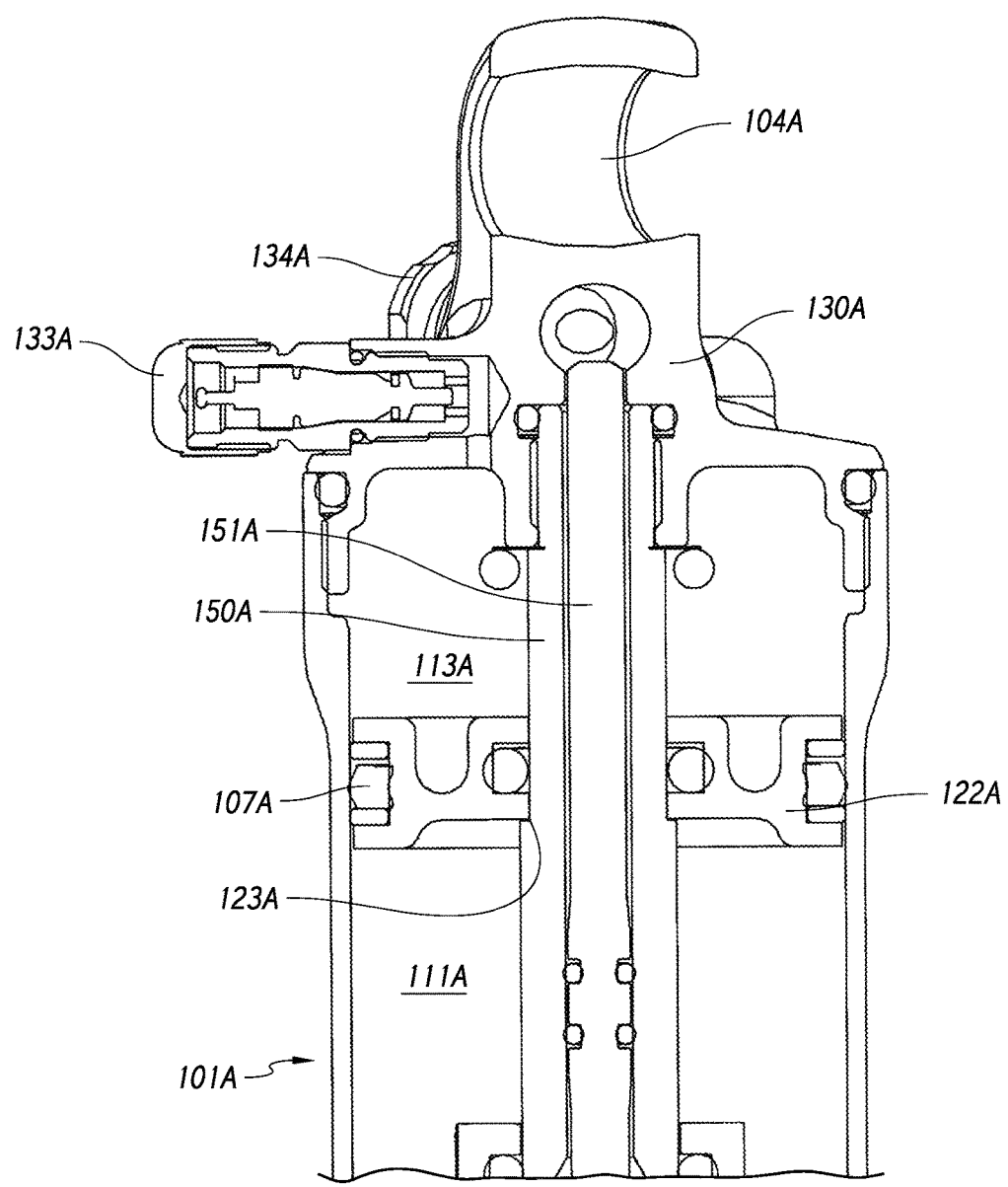
FIG. 4C illustrates an additional partial cross section view of the air spring of FIG. 4A.

FIG. 4B illustrates a partial cross section view of the air spring of FIG. 4A. FIG. 4C illustrates an additional partial cross section view of the air spring of FIG. 4A. In some embodiments, the primary chamber 111A can include a primary chamber valve 131A, as illustrated in FIG. 4B, configured to allow an external pressure source to fluidly couple to the primary chamber 111A and adjust the pressure within the primary chamber 111A. By adjusting the pressure within the primary chamber 111, the shape of the spring curve can be manipulated. In some embodiments, the primary chamber valve 131A can be fluidly connected to the primary chamber 111A via a channel within the air spring 100A. In some embodiments, including the embodiment illustrated in FIG. 4B, the valve can be fluidly coupled to the primary chamber via the channel in the damping fixation shaft 150A. In some embodiments, the damping adjustment rod 151A, can be disposed within the channel in the damping fixation shaft 150. In some embodiments, the damping adjustment rod 151A can be sized to include a gap between the damping adjustment rod 151A and the inner wall of the damping fixation shaft 150A such that a gas can travel through the channel of the damping fixation shaft 150A. In some embodiments, the primary chamber valve 131A can include an orifice between the channel of the damping fixation shaft 150A and the primary chamber 111A to allow gas to pass when adjusting the pressure of the primary chamber 111A.

Figure 5A:
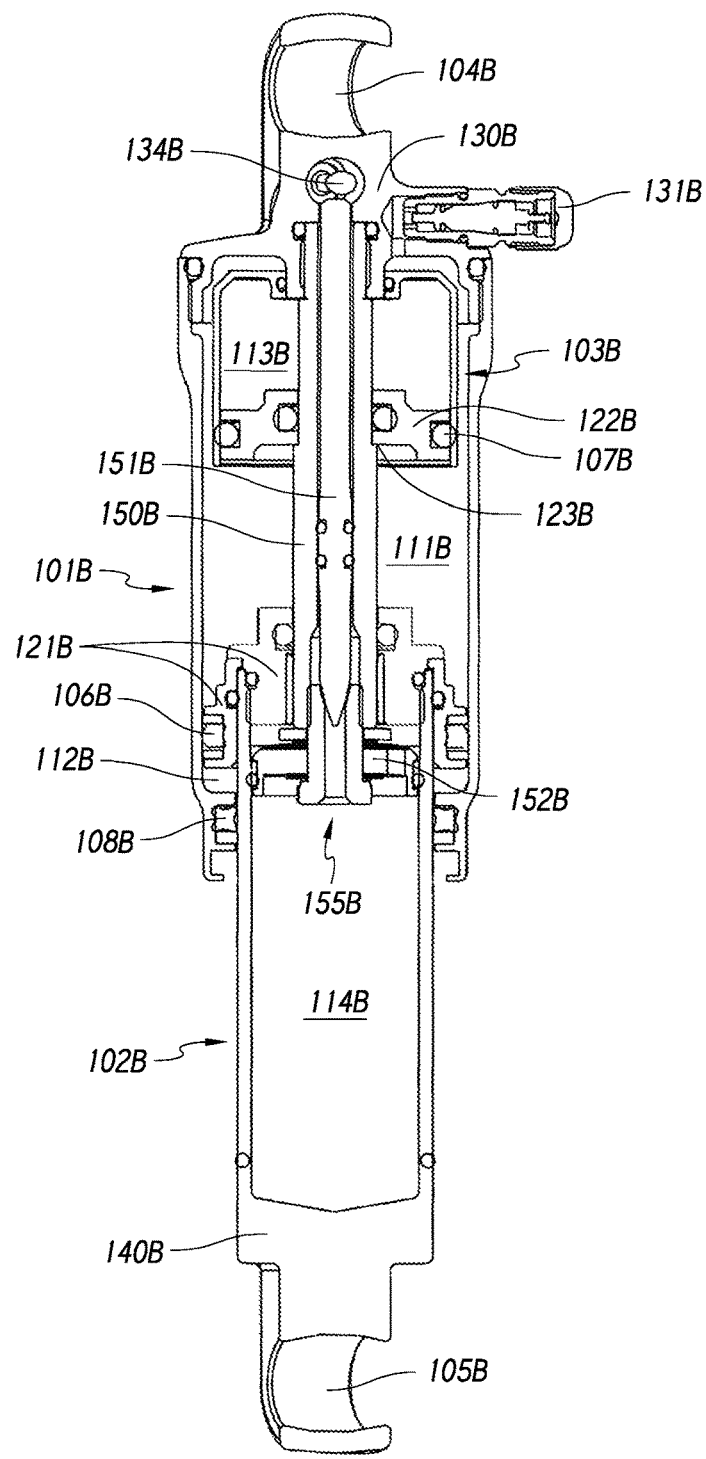
FIG. 5A illustrates a cross section view of one embodiment of an air spring in a fully extended position.
Figure 5B:
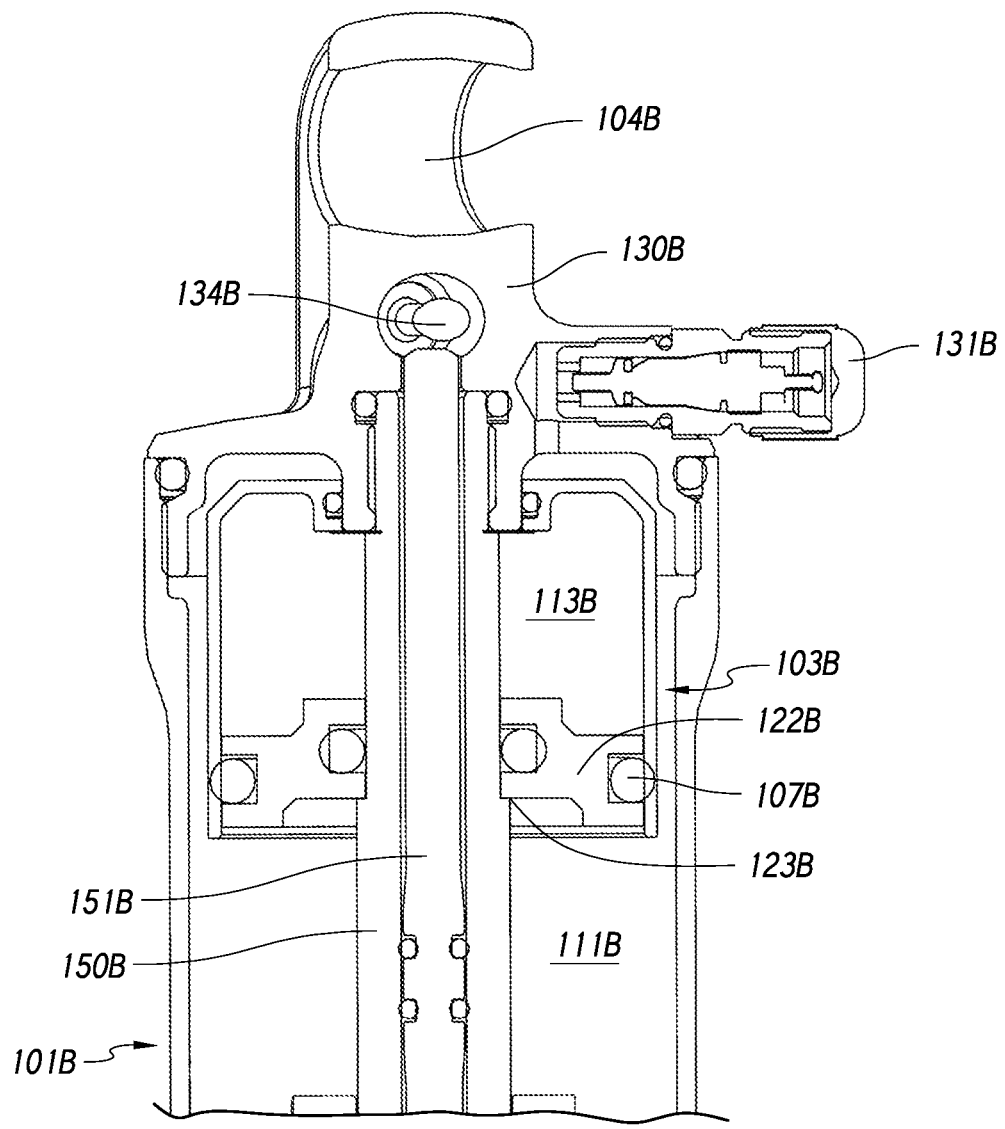
FIG. 5B illustrates a partial cross section view of the air spring of FIG. 5A.

FIG. 5A illustrates a cross section view of one embodiment of an air spring 100B in a fully extended position. FIG. 5B illustrates a partial cross section view of the air spring 100B of FIG. 5A. In some embodiments, the air spring 100B can include a second piston 122B. The second piston 122B can be configured to slide within the air spring 100B. In some embodiments, including the embodiment illustrated in FIG. 5A, the second piston 122B can be configured to slide within the third member 103B and seal against the third member 103B. The second piston 122B can include a sealing member 107B configured to seal against the third member 103B of the air spring 100B. In some embodiments, the third member 103B can be located within the first member 101B. In some embodiments, the third member 103B can be disposed within the primary chamber 111B. In some embodiments, the second piston 122B can be adjacent the primary chamber 111B.

In some embodiments, including the embodiment illustrated in FIG. 5A, the air spring 100B can include a third pressurized chamber, such as a compensation chamber 113B. In some embodiments, the compensation chamber 113B can be disposed within the third member 103B of the air spring 100B. The third member 103B can seal the primary chamber 111B from the compensation chamber 113B. The compensation chamber 113B can be pressurized with a gas. The second piston 122B can be adjacent the compensation chamber 113B. The second piston 122B can between a first end and a second end of the compensation chamber 113B. The pressurized gas within the primary chamber 111B can exert a force on a first side of the second piston 122B, the bottom side for example as illustrated in FIG. 5A, forcing the second piston 122B away from the primary chamber 111B and towards the compensation chamber 113B. The pressurized gas within the compensation chamber 113B can exert a force on a second side of the second piston 122B, the top side for example as illustrated in FIG. 5A, forcing the second piston 122B away from the compensation chamber 113B and towards the primary chamber 111B. The air spring 100B can be configured such that as the pressure in the primary chamber 111B increases, the pressurized gas within the primary chamber 111B can force the second piston 122B to slide towards the compensation chamber 113B, increasing the volume of the primary chamber 111B and decreasing the volume of the compensation chamber 113B.

Figure 5C:
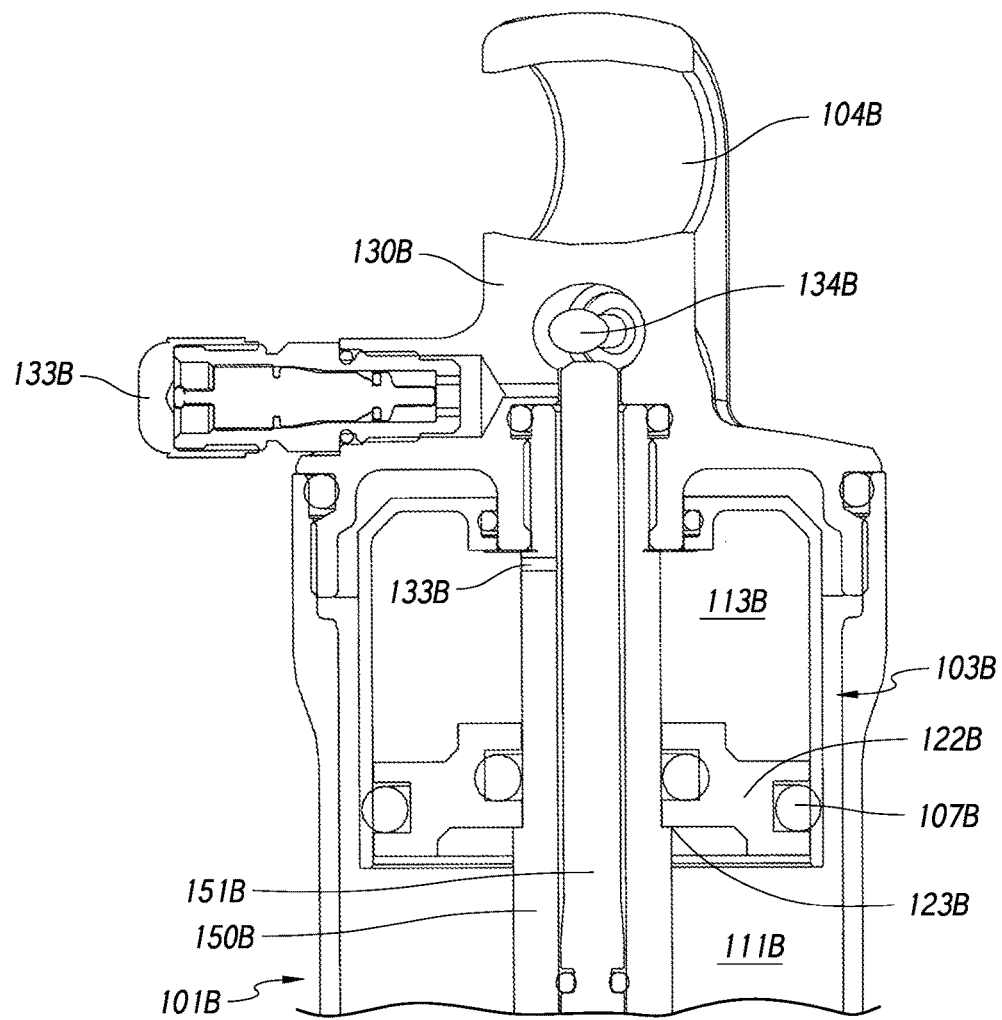
FIG. 5C illustrates an additional partial cross section view of the air spring of FIG. 5A.

FIG. 5C illustrates an additional partial cross section view of the air spring 100B of FIG. 5A. In some embodiments, the compensation chamber 113B can include a compensation chamber valve 133B, as illustrated in FIG. 5C, configured to allow an external pressure source to fluidly couple to the compensation chamber 113B and adjust the pressure within the compensation chamber 113B. By adjusting the pressure within the compensation chamber 113B, the shape of the spring curve can be manipulated. In some embodiments, the compensation chamber 113B can be fluidly connected to the compensation chamber 113B via a channel within the air spring 100B. In some embodiments, including the embodiment illustrated in FIG. 5C, the valve can be fluidly coupled to the compensation chamber 113B via the channel in the damping fixation shaft 150B. In some embodiments, the primary chamber valve 131B can include an orifice between the channel of the damping fixation shaft 150B and the compensation chamber 113B to allow gas to pass when adjusting the pressure of the compensation chamber 113B.

Figure 6A:
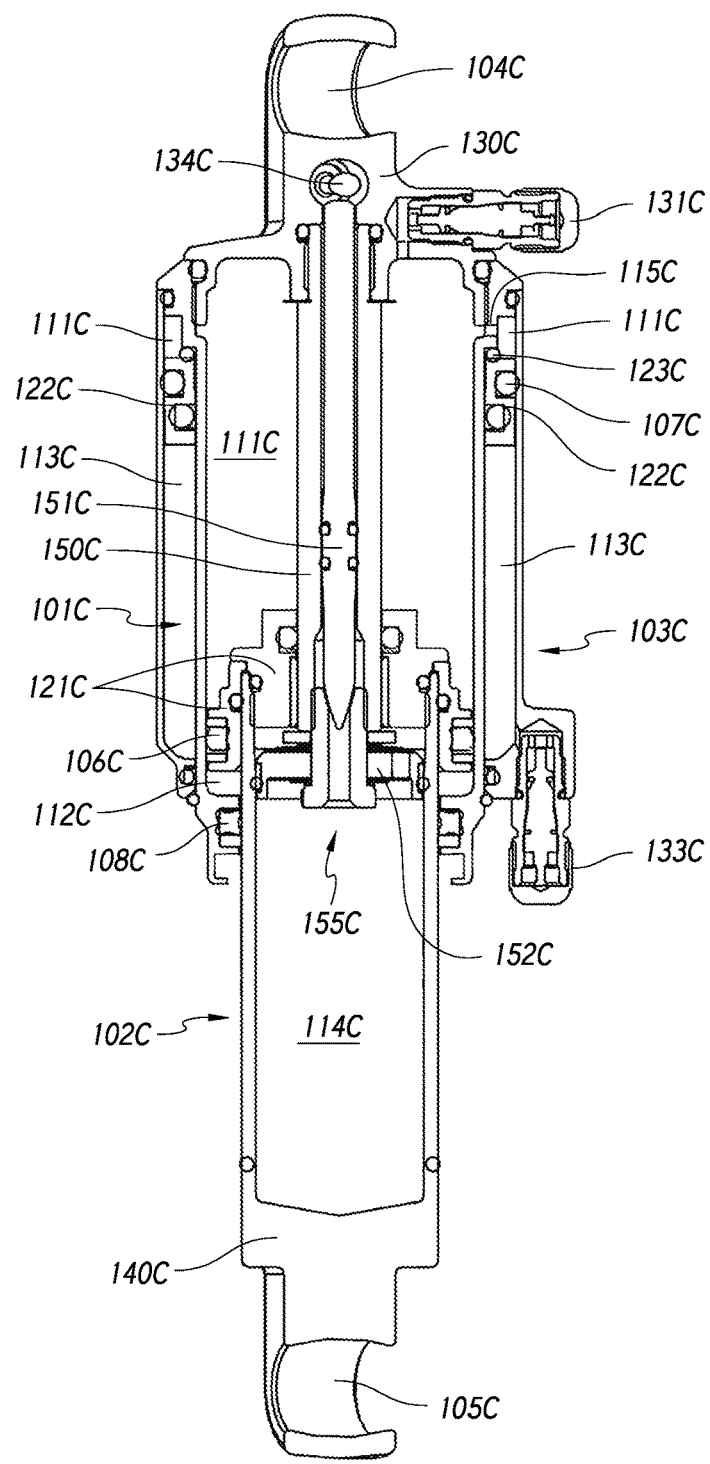
FIG. 6A illustrates a cross section view of one embodiment of an air spring in a fully extended position.
Figure 6B:
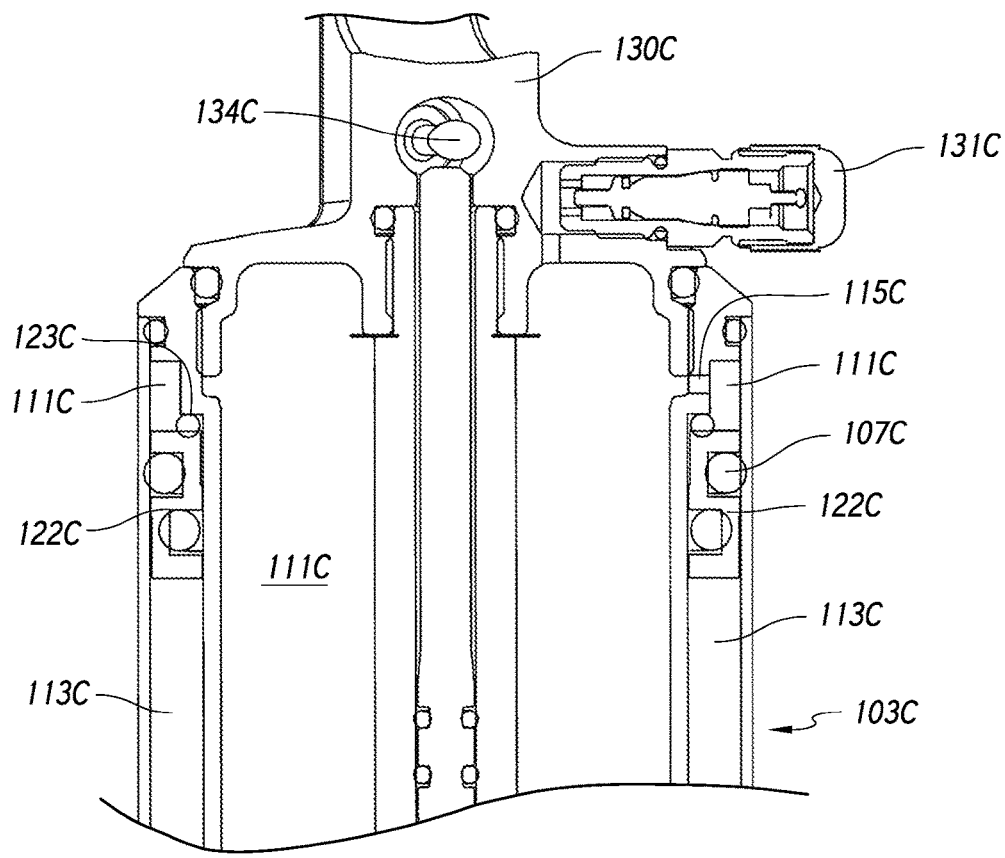
FIG. 6B illustrates a partial cross section view of the air spring of FIG. 6A.

FIG. 6A illustrates a cross section view of one embodiment of an air spring 100C in a fully extended position. FIG. 6B illustrates a partial cross section view of the air spring 100C of FIG. 6A. In some embodiments, the air spring 100C can include a second piston 122C. The second piston 122C can be configured to slide within the air spring 100C. In some embodiments, including the embodiment illustrated in FIG. 6A, the second piston 122C can be configured to slide within the third member 103C and seal against the third member 103C. The second piston 122C can include a sealing member 107C configured to seal against the third member 103C of the air spring 100C. In some embodiments, the third member 103C can be located around the first member 101C such that the first member is substantially within the third member 103C. In some embodiments, the second piston 122C can include an aperture configured to receive the first member 101C. The second piston 122C can be configured to seal against the first member 101C.

In some embodiments, the primary chamber 111C can be at least partially disposed within the third member 103C as well as the first member 101C. In some embodiments, at least a portion of the primary chamber 111C can be formed between the first member 101C and the third member 103C. In some embodiments, the primary chamber 111C can include a primary chamber extension portion 115C, which may include for example, a hollow channel, which fluidly connects the portion of the primary chamber 111C within the first member 101C to the portion of the primary chamber 111C between the first member 101C and the third member 103C. In some embodiments, the primary chamber extension portion 115 can be formed in the cap 130 of the air spring 100. In some embodiments, the second piston 122C can be adjacent the primary chamber 111C.

In some embodiments, including the embodiment illustrated in FIG. 6A, the air spring 100C can include a third pressurized chamber, such as a compensation chamber 113C. In some embodiments, the compensation chamber 113C can be disposed within the third member 103C of the air spring 100C. In some embodiments, the compensation chamber 113C can be formed between the first member 101C and the third member 103C. The compensation chamber 113C can be pressurized with a gas. The second piston 122C can be adjacent the compensation chamber 113C. The second piston 122C can be disposed at a first end, such as the top end, of the compensation chamber 113C. The pressurized gas within the primary chamber 111C can exert a force on a first side of the second piston 122C, the top side for example as illustrated in FIG. 6A, forcing the second piston 122C away from the primary chamber 111C and towards the compensation chamber 113C. The pressurized gas within the compensation chamber 113C can exert a force on a second side of the second piston 122C, the bottom side for example as illustrated in FIG. 6A, forcing the second piston 122C away from the compensation chamber 113C and towards the primary chamber 111C. The air spring 100C can be configured such that as the pressure in the primary chamber 111C increases, the pressurized gas within the primary chamber 111C can force the second piston 122C to slide towards the compensation chamber 113C, increasing the volume of the primary chamber 111C and decreasing the volume of the compensation chamber 113C.

In some embodiments, the air spring 100C can include a retaining portion 123C configured to limit displacement of the second piston 122C away from the compensation chamber 113C and towards the primary chamber 111C. In some embodiments, the retaining portion 123C can comprise a protrusion from the wall of the chamber in which the second piston 122C is sliding. In some embodiments, including the embodiment illustrated in FIG. 6A, the retaining portion 123C can comprise a protrusion from the first member 101C. In other embodiments, the retaining portion 123C can comprise a protrusion from the third member 101C.

In some embodiments, the air spring 100C can include a compensation chamber valve 133C configured to allow an external pressure source to fluidly couple to the compensation chamber 113C and adjust the pressure within the compensation chamber 113C.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein. Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of the device as implemented.

Certain features that are described in this specification in the context of separate implementations also can be implemented in combination in a single implementation. Conversely, various features that are described in the context of a single implementation also can be implemented in multiple implementations separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

In describing the present technology, the following terminology may have been used: The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" means quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide. Numerical data may be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but also include individual values and sub-ranges within the indicated range. Thus, included in this numerical range are individual values such as 2, 3 and 4 and sub-ranges such as 1-3, 2-4 and 3-5, etc. This same principle applies to ranges reciting only one numerical value (e.g., "greater than about 1") and should apply regardless of the breadth of the range or the characteristics being described. A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives, and is not intended to limit the selection to only those listed alternatives or to only one of the listed alternatives at a time, unless the context clearly indicates otherwise.

It should be noted that various changes and modifications to the presently preferred embodiments described herein will be apparent to those skilled in the art. Such changes and modifications may be made without departing from the spirit and scope of the invention and without diminishing its attendant advantages. For instance, various components may be repositioned as desired. It is therefore intended that such changes and modifications be included within the scope of the invention. Moreover, not all of the features, aspects and advantages are necessarily required to practice the present invention. Accordingly, the scope of the present invention is intended to be defined only by the claims that follow.

What is claimed is:

1. A bicycle comprising:
   a frame;
   an air spring configured to regulate the position of a wheel relative the frame, comprising:
      a first member and a second member, wherein the second member slideably moves relative to the first member when the air spring is compressed or extended;
      a pressurized first chamber located substantially within the first member;
      a first piston affixed to an end of the second member and configured to slideably move relative to the first chamber;
      a pressurized second chamber adjacent the first piston and opposite the first chamber;
      wherein the first piston is configured to seal the first chamber from the second chamber;
      the air spring configured such that the first piston decreases the volume of the first chamber during a compression motion of the air spring and the first piston increases the volume of the first chamber during an extension motion of the air spring;
      a second piston configured adjacent to the first chamber and configured to slideably move to increase or decrease the volume of a pressurized third chamber;
      wherein the first piston is disposed at the end of the second member and the second piston is disposed to bound a portion of the third chamber; and
      wherein the first and second piston are coaxially arranged.

2. The bicycle of claim 1, wherein the frame further comprises:
   a main frame and an articulating sub-frame rotatably coupled to the main frame;
   wherein the first member has a first coupling portion rotatably connectable to one of the main frame and the sub-frame and the second member has a second coupling portion rotatably connectable to the other of the main frame and the sub-frame; and
   the first and second members are coupled to the main frame and sub-frame to regulate the position of a rear wheel.

3. The bicycle of claim 1, wherein the third chamber is disposed within the air spring such that the third chamber and the second chamber overlap during at least a portion of the compression motion of the air spring.

4. The bicycle of claim 3, further comprising:
   a gas in the pressurized first chamber;
   wherein said first piston moves towards the first chamber during compression of the air spring, said first piston pushes at least a portion of said gas within said first chamber in a direction opposite said first piston;
   wherein the air spring is configured such that the at least a portion of the gas within the first chamber moved by the first piston in a direction opposite the first piston moves the second piston toward the second chamber when the pressure inside the first chamber is greater than the pressure inside the third chamber.

5. The bicycle of claim 4, wherein the air spring further comprises a third member, the third member surrounds the first member such that the first member is substantially within the third member, and the second piston defines an aperture configured such that it receives and seals against an outer surface of the first member.

6. The bicycle of claim 1, further comprising a retaining portion, the retaining portion configured to limit displacement of the second piston towards the first chamber, wherein the retaining portion is configured to retain the second piston in a retained position until the pressure in the first chamber is greater than the pressure in the third chamber.

7. The bicycle of claim 6,
   wherein the second piston bounds a portion of the first chamber and is configured such that moving the second piston from the retained position increases the volume of the first chamber without forcing a gas in the first chamber through an area of reduced cross-section.

8. A bicycle comprising:
   a frame;
   an air spring configured to regulate the position of a wheel relative the frame, comprising:
      a first member and a second member, wherein the second member slideably moves relative to the first member when the air spring is compressed or extended;
      a pressurized first chamber located substantially within the first member;
      a first piston affixed to an end of the second member and configured to slideably move relative to the first chamber;
      a pressurized second chamber adjacent the first piston and opposite the first chamber;
      wherein the first piston is configured to seal the first chamber from the second chamber;
      the air spring configured such that the first piston decreases the volume of the first chamber during a compression motion of the air spring and the first piston increases the volume of the first chamber during an extension motion of the air spring;
      a second piston configured adjacent to the first chamber and configured to slideably move relative to a pressurized third chamber, the second piston configured to seal the first chamber from the third chamber; and
      wherein the second piston and the second member are configured in a coaxial alignment and are positioned such that the second piston and second member can overlap during at least a portion of the compression motion of the air spring.

9. The bicycle of claim 8, wherein the frame further comprises:
   a main frame and an articulating sub-frame rotatably coupled to the main frame;
   the first member of the air spring comprising a first coupling portion rotatably connectable to one of the main frame and the sub-frame and the second member of the air spring comprising a second coupling portion rotatably connectable to the other of the main frame and the sub-frame; and
   the first and second members are coupled to the main frame and sub-frame to regulate the position of a rear wheel.

10. The bicycle of claim 8, wherein the third chamber is disposed within the air spring such that the third chamber and the second chamber overlap during at least a portion of the compression motion of the air spring.

11. The bicycle of claim 10, further comprising:
a gas in the pressurized first chamber;
wherein said first piston moves towards the first chamber during compression of the air spring, said first piston pushes at least a portion of said gas within said first chamber in a direction opposite said first piston;
wherein the air spring is configured such that the at least a portion of the gas within the first chamber moved by the first piston in a direction opposite the first piston moves the second piston toward the second chamber when the pressure inside the first chamber is greater than the pressure inside the third chamber.

12. The bicycle of claim 11, wherein the air spring further comprises a third member, the third member surrounds the first member such that the first member is substantially within the third member, and the second piston defines an aperture configured such that it receives and seals against an outer surface of the first member.

13. The bicycle of claim 8, further comprising a retaining portion, the retaining portion configured to limit displacement of the second piston towards the first chamber, wherein the retaining portion is configured to retain the second piston in a retained position until the pressure in the first chamber is greater than the pressure in the third chamber.

14. The bicycle of claim 13,
wherein the second piston bounds a portion of the first chamber and is configured such that moving the second piston from the retained position increases the volume of the first chamber without forcing a gas in the first chamber through an area of reduced cross-section.

\* \* \* \* \*